United States Patent
Mutsuga et al.

[19]

[11] Patent Number: 5,911,773
[45] Date of Patent: Jun. 15, 1999

[54] NAVIGATION SYSTEM FOR VEHICLES

[75] Inventors: Katsuhiko Mutsuga; Shinichi Kato, both of Anjo, Japan

[73] Assignee: Aisin AW Co., Ltd., Japan

[21] Appl. No.: 08/678,051

[22] Filed: Jul. 10, 1996

[30] Foreign Application Priority Data

Jul. 24, 1995 [JP] Japan ................................. 7-208357
Apr. 23, 1996 [JP] Japan ................................. 8-101388

[51] Int. Cl.[6] .......................... G06F 165/00; G08G 1/123
[52] U.S. Cl. ...................... 701/200; 701/201; 701/210; 701/211; 340/990; 340/995; 342/454
[58] Field of Search .................................. 701/201, 202, 701/204, 205, 207, 208, 209, 210, 211, 213; 340/990, 995, 905; 342/357, 457, 454, 456

[56] References Cited

U.S. PATENT DOCUMENTS

| | | | |
|---|---|---|---|
| 5,168,452 | 12/1992 | Yamada et al. | 701/202 |
| 5,293,163 | 3/1994 | Kakihara et al. | 340/995 |
| 5,369,588 | 11/1994 | Hayami et al. | 701/209 |
| 5,371,678 | 12/1994 | Nomura | 701/210 |
| 5,428,545 | 6/1995 | Maegawa et al. | 701/210 |
| 5,486,822 | 1/1996 | Tenmou et al. | 701/202 |
| 5,506,779 | 4/1996 | Kanki | 701/209 |
| 5,513,110 | 4/1996 | Fujita et al. | 701/207 |
| 5,568,390 | 10/1996 | Hirota et al. | 701/201 |
| 5,703,780 | 12/1997 | Takanabe et al. | 340/990 |
| 5,712,632 | 1/1998 | Nishimura et al. | 340/995 |

*Primary Examiner*—Tan Q. Nguyen
*Attorney, Agent, or Firm*—Lorusso & Loud

[57] ABSTRACT

The vehicle navigation system suggests route to a destination and repeats searching for a new optimal route in response to changes in traffic conditions near the present position of the vehicle. The system includes a present position calculator 4A for calculating the present position of the vehicle, an information storage unit 3 for storing road data 3B for searching, a traffic information receiver 4F for acquiring traffic information 5, a route searcher 4B for searching for the optimal route from the present position to the destination based on a navigation program 3A, the road data, and the acquired traffic information, and an area setter 4C for setting a given range near the present position of the vehicle, whereby the route searcher selects and acquires traffic information corresponding to the road data within the set area, and searches for the optimal route by first changing road data based on the acquired traffic information.

21 Claims, 18 Drawing Sheets

Suggested (guidance) road data

| Block number (n) | | | |
|---|---|---|---|
| 1 | Road number (m) | | (Example) |
| | ① | Starting point | I |
| | | Terminal point | II |
| | | Roads having the same starting point | ... |
| | | Roads having the same terminal point | ②③④⑤⑥ |
| | | Length | 50m |
| | | Road attribute | Prefectural road |
| | | Width | 6m |
| | | Road unnecessary for guidance | ③ |
| | | Prohibition information | ⑤ |
| | | Node data address and size | ... |
| | ⋮ | ⋮ | |
| | ⓜ | | |
| ⋮ | ⋮ | | |
| n | | | |

VICS transmitting data

| Link number (k) | |
|---|---|
| 1 | Degree of traffic congestion |
| | Foremost position of congested section |
| | Length of congested section |
| | Traffic restriction information |
| | Traveling time |
| ⋮ | ⋮ |
| k | |

Correspondence table of VICS transmitting data and road data in storage unit

| VICS link number (k) | |
|---|---|
| 1 | CD link number 3 |
| | CD link number 4 |
| | CD link number 5 |
| ⋮ | ⋮ |
| k | |

Searching range

NAVIGATION SYSTEM FOR VEHICLES

BACKGROUND OF THE INVENTION

The present invention relates to a vehicular navigation system by which it is possible to search for the optimal route from the present position of the automotive vehicle to a destination and to guide the vehicle along the optimal route to the destination.

The vehicular navigation system searches for a route from the present position or from the starting point to the destination based on input of data such as destination data and suggests a route according to the searched optimal route, thus providing a driver with information on the route to the destination while the driver is driving the vehicle on an unknown or an unfamiliar route. In this route searching, if the driver encounters traffic congestion or traffic restriction on the way, the optimal route can be searched again.

For example, it is proposed in JP-A-7-182596 and JP-A-62-95423 that, in case traffic information such as traffic jam information is received and a congested section point is detected ahead on the optimal route already set, an attempt is made to avoid passing through the congested section or to make it difficult to pass through the congested section by increasing cost (e.g. length) of road data of that section and to search again for another route to avoid the congested section. In JP-A-6-186049, it is disclosed that a route from the present position to the destination is searched again with respect to the route already suggested by adding VICS (Vehicle Information & Communication System) information.

In the system as disclosed by the above JP-A-7-182596 and JP-A-62-95423, only where there is traffic jam information for the already suggested route, is the road data of the route updated and the route searched again. In case traffic jam information is detected on a route ahead in the advancing direction during route guidance and the destination can be reached earlier if the vehicle runs along a byroad or makes a detour, the system is effective to find such a byroad or a detour. However, when the presently suggested route has been searched by adding traffic jam information and the search results suggest need to make a detour of a main road because the main road, usually not jammed, is currently jammed because of construction work or traffic accident as shown in FIG. 15(A), and in case the traffic jam has been already dissolved while the vehicle was running along the already suggested route, such information is not given even though the vehicle can reach the destination earlier by running along the main road.

Also, the system proposed in JP-A-6-186049 is disadvantageous in that much time is required for searching the route because re-searching must be carried out by adding traffic jam information on a wide area including the present position and the destination, and traffic jam information of zones remote from the present position and unnecessary for the searching is also added.

Incidentally, VICS is now in the stage of practical application and its service area is gradually expanding. Thus, it is an important problem how efficiently real-time road traffic information can be utilized for searching for an optimal navigation route within a short time.

SUMMARY OF THE INVENTION

To solve the above problems, it is an object of the present invention to provide a vehicular navigation system by which it is possible to search the optimal route within a short time based upon changes of traffic conditions near the present position of the vehicle.

To attain the above object, as shown in FIG. 1(A) the vehicular navigation system of the present invention, for suggesting a route to a destination inputted according to an already set route, comprises a present position calculating means 4A for calculating the present position of the vehicle, an information storage unit 3 for storing road data 3B for searching the route, a traffic information acquiring means 4F for acquiring traffic information 5, a route searching means for searching the optimal route from the present position to the destination according to a navigation program 3A, said suggested road data and said acquired traffic information, and an area setting means 4C for setting a given range of area near the present position of the vehicle, whereby said route searching means selects and acquires traffic information corresponding to the suggested road data within the preset area among said suggested road data, and searches the route by converting the suggested road data based on the traffic information thus acquired.

Also, as shown in FIG. 1(B), the vehicular navigation system according to the present invention may further include neighborhood searching data acquiring means 4D for acquiring the suggested road data within the preset area as acquired neighborhood searching data, and a neighborhood searching data memory means 4E for storing said acquired neighborhood searching data, whereby said route searching means selects and acquires traffic information corresponding to the neighborhood searching data and searches the route after changing the neighborhood searching data based on the acquired traffic information.

According to the present invention, an area including the present position is set and traffic information is acquired for road data within said area, and if traffic congestion information is detected based on said road data, the traffic congestion information is added. Therefore, it is possible to search the optimal route not only according to changes on the route where the vehicle is currently running but also according to changes in traffic conditions near the present position because the route is searched again. For example, searching can be carried out again even in the case where a route had been suggested because traffic congestion was found on an other road at the time of the initial searching, while traffic congestion on that other road has dissolved during driving and it is judged that the destination can be reached earlier if the vehicle is driven along that other road from the present position.

Traffic congestion information is changing every moment while the vehicle is driven and traffic congestion information for a road remote from the present position is unnecessary.

In the present invention, traffic congestion information on the road near the present position is acquired and road data is updated. Accordingly, it is possible to select only useful information, to perform re-searching for finding the optimal route, and to shorten the processing time.

DESCRIPTION OF THE PREFERRED EMBODIMENTS

Figure 1A:
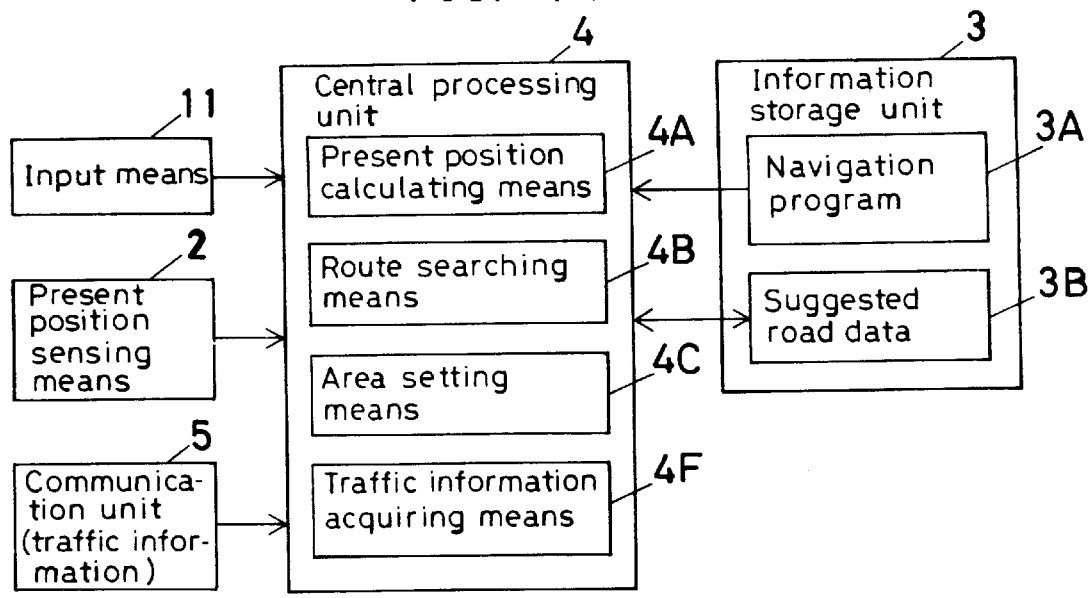
FIGS. 1A and 1B are block diagrams of embodiments of vehicular navigation systems according to the present invention.
Figure 1B:
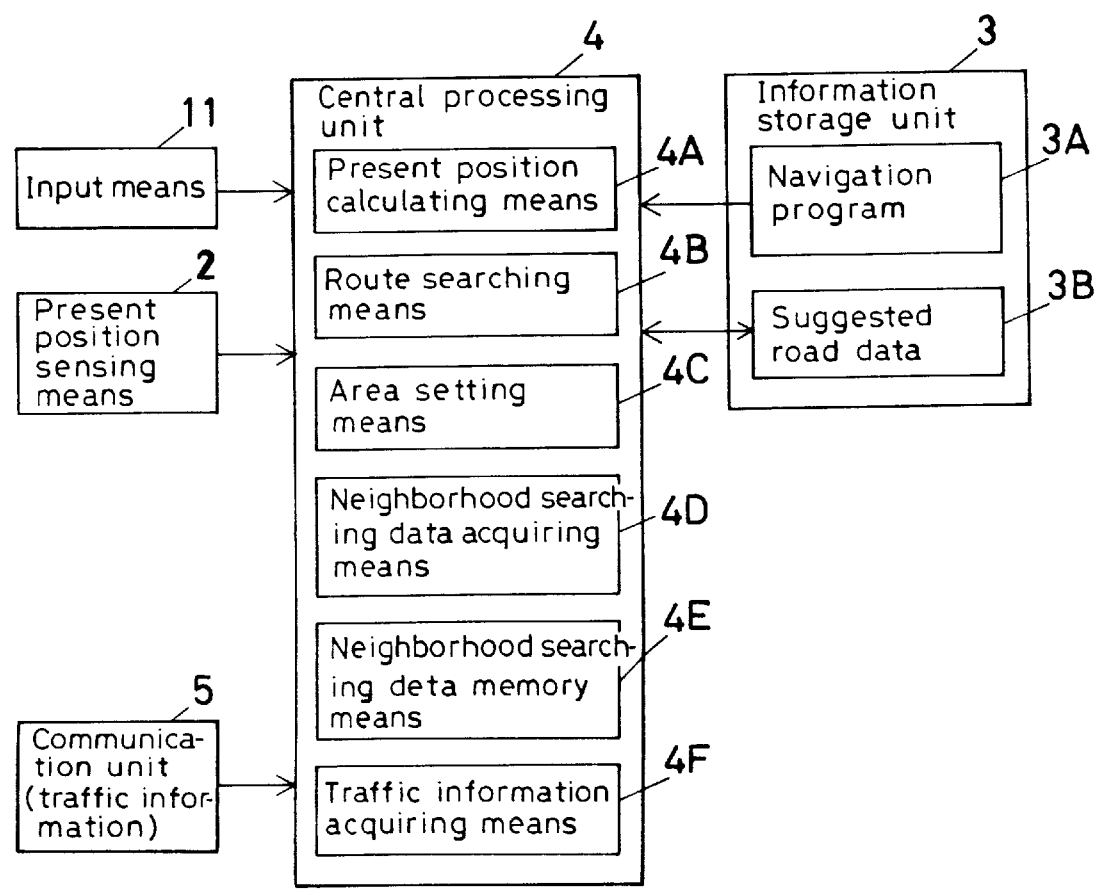
Figure 2:
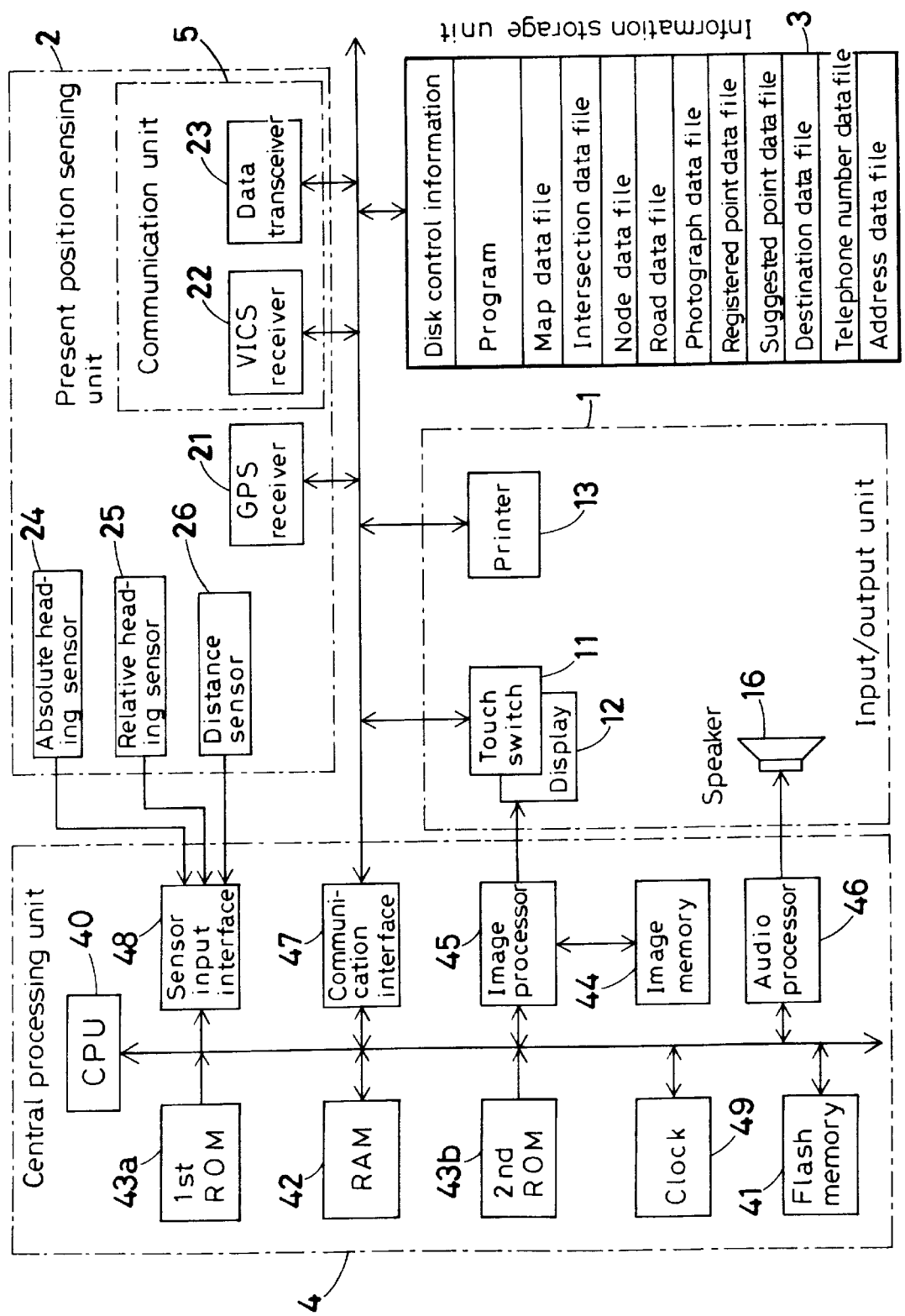
FIG. 2 is a block diagram showing an example of a vehicular navigation system, to which the present invention is applied.

In the following, embodiments of the present invention will be described in connection with the drawings. FIG. 2 represents a general block diagram of an example of a vehicular navigation system, to which the present invention is applied. The vehicular navigation system according to the present invention comprises an input/output unit 1 for inputting and outputting information related to route guidance, a present position detecting unit 2 for detecting or receiving information relating to the present position of the vehicle, and an information storage unit 3 for storing navigation data necessary for calculating the route, display/audio guiding data required for route guidance and programs (OS and/or application), etc., and a central processing unit 4 for performing display/audio guidance processing necessary for route search processing and route guidance and also for controlling the entire system. First, description will be given on arrangement of each component.

The input/output unit 1 instructs navigation processing to the central processing unit 4 in accordance with the intention of the driver so that guiding information can be given by at least one of audio data and/or screen data, as the driver considers necessary, and also prints out the data after the processing. As the means to fulfill these functions, the input unit comprises a touch switch 11 and an operating switch for inputting the destination data, as a telephone number or coordinates on a map, or for requesting route guidance. Naturally, it may be an input unit such as a remote controller. The output unit comprises a display unit 12 for displaying the inputted data on screen or for automatically displaying route guidance on screen in response to a request of the driver, a printer for printing out data processed in the central processing unit 4 or data stored in the information storage unit 3, and a speaker for issuing audio information of route guidance.

Here, a voice recognizing unit for achieving voice input or a recording card reader for reading data recorded on an IC card or a magnetic card may be added. Or, a data communication unit may be added, which is used to send or receive data to or from an information source such as personal computer, wherein data specific to the driver such as map data, destination data, etc. are stored.

The display unit 12 comprises a color CRT or a color liquid crystal display unit and outputs color display screens necessary for navigation such as a route setting screen, a sector map screen, an intersection screen, based on map data and guidance data processed by the central processing unit 4. It also displays buttons for setting the route guidance, providing the route guidance or switching of screens. In particular, transit intersection information such as transit intersection name is given in pop art color display on the sector map screen as necessary.

This display unit 12 is provided in an instrument panel near the driver's seat. The driver can confirm the present position of the vehicle by watching the displayed map and can acquire information on the route, along which the vehicle should be driven.

Also, a touch switch (input unit) 11 to match the display of a functional button is provided on the display unit 12, and by touching the button, a signal is inputted to carry out the above operation. The input signal generating means consisting of this button and the touch switch constitutes an input unit, but detailed description is not given here.

The present position sensing unit 2 senses or receives information related to the present position of the automotive vehicle, and it comprises an absolute heading sensor 24 having a geomagnetic sensor and the like, a relative heading sensor 25 having a steering sensor, gyro, etc., a distance sensor 26 for detecting running distance from number of revolutions of wheels, a GPS receiver 21 utilizing a satellite navigation system or global positioning system (GPS), and a communication unit 5. The communication unit 5 comprises a VICS receiver 22, serving as traffic information acquiring means, or a data transceiver 23. The VICS receiver 22 receives road traffic information by means of FM multiplex, radio beacon, or optical beacon, and the data transceiver 23 is, for example, a portable telephone set or a personal computer. Information necessary for navigation is sent to or received from a traffic information center (such as ATIS) at the request of the driver.

The information storage unit 3 is an external storage unit wherein navigation programs and data are stored in an external storage medium such as a CD-ROM (hereinafter simply referred as "CD"), optical CD, IC card, etc. The navigation program comprises a map drawing unit, a route searching unit, a route guidance unit, a present position calculating unit, a destination setting operation control unit, etc. It has an application sector for processing navigation signals and an OS sector. Here, programs for executing routines such as route searching, display output control necessary for route guidance, programs for carrying out audio output control necessary for audio guidance and data necessary for it, and further, display information data necessary for route guidance and map display are stored. Information storage unit 3 also stores all data necessary for navigation such as map data, intersection data, road data, various types of guidance data, etc. More specifically, information storage unit 3 stores a program for setting a destination or a transit point based on position information from the present position sensing unit 2 or an input signal from the input unit 11 and for executing route searching using the suggested road data, a program for converting the suggested road data based on traffic information acquired from the communication unit 5 and for executing the route searching again, and a program for determining audio output timing or content of audio phrase along the route. By starting the programs stored in the information storage unit 3, functions for navigation in the present invention are carried out. In one aspect of the present embodiment, programs for executing the functions of the present invention are also stored in the information storage unit 3, which is an external storage medium.

The central processing unit 4 comprises a CPU 40 for executing various arithmetic operations and a flash memory 41 for reading and storing programs from CD of the information storage unit 3. The flash memory 41 erases the existing program and makes it reloadable even when programs on CD have been changed. There are provided a first ROM 43*a* for storing programs to perform program check of the flash memory 41 and to update (program reading means), a RAM 42 for temporarily storing route guidance information such as coordinates of the preset destination, road code number, etc. or data undergoing arithmetic processing, and a second ROM 43*b* wherein display information data necessary for route guidance and map display are stored. The programs for updating as described above may be stored in the external storage unit.

Further, there are provided an image memory 44 for storing image data used for screen displays of the display unit, an image processor 45 for reading image data from the image memory based on display control signals from the CPU 40 and for outputting to the display unit 12 after image processing, an audio processor 46 for synthesizing audio phrases read from RAM 42 based on audio output control signals from CPU 40, for putting sentences, sounds, etc. together, for converting them into analog signals and for outputting them to the speaker 16, a communication interface 47 for sending and receiving input/output data to or from the communication unit 5, a sensor input interface 48 for picking up sensor signals of the present position sensing unit 2, and a clock 49 for registering data and time as internal dialog information.

In the central processing unit 4, when the data acquired by each sensor in the present position sensing unit 2 is received through the sensor input interface 48, CPU 40 calculates coordinates of the present position at a constant interval based on these data, and the results are temporarily written in RAM 42. The present position coordinates are the ones processed by map matching, taking detection error for each item of data into account. Output values of each type of sensor are constantly corrected. Route guidance is performed by screen display and audio output. The driver can select whether or not audio output is to be given.

Figures 3A, 3B:
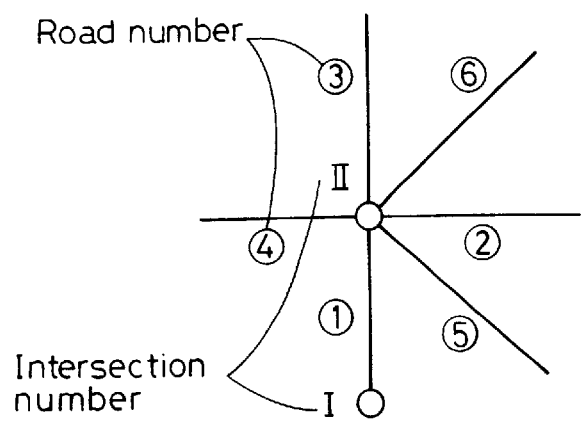
FIGS. 3A and 3B represent a preferred road searching data file of the present invention.
Figure 9:
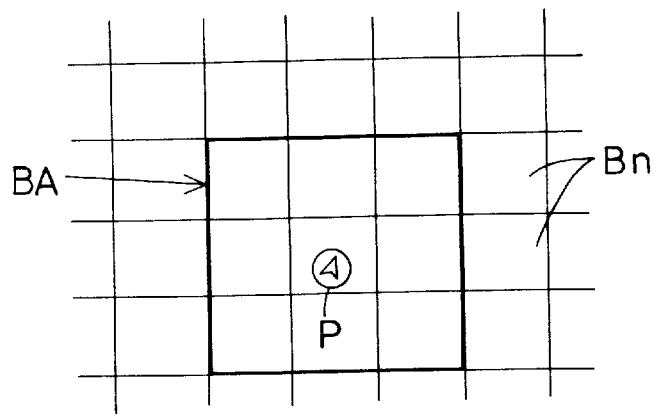
FIG. 9 is a diagram explaining setting of a neighborhood area for acquiring neighborhood searching data in the subroutine of FIG. 8.

FIG. 3 shows a suggested road (guidance) data file where data necessary for calculating the route by the route searching unit and for carrying out route guidance are stored. FIG. 3(A) shows data structure, and FIG. 3(B) represents a diagram for explaining the data. In the present invention, as shown in FIG. 9, the suggested road data are divided into a plurality of blocks Bn, each covering an area of 3 to 10 km in radius, and the data are controlled for each block. For each of block numbers (from 1 to n), there are road numbers (1 to m). For each road number, there are data including coordinates of the starting point and the terminal point, roads having the same starting point, roads having the same terminal point, length, road attributes, width, roads not requiring guidance$_1$ prohibition information such as no entry, one way, etc., address and size of node data etc. Road numbers are set both for outward course and return course for each road segment between intersections (branch points). The road attribute is the data indicating information on road type such as a national road, an overpass, an underpass, number of lanes, etc. The node data is coordinate data, which consists of longitude and latitude data for each of the nodes when the road is divided into a plurality of nodes.

Figures 4, 5A, 5B:
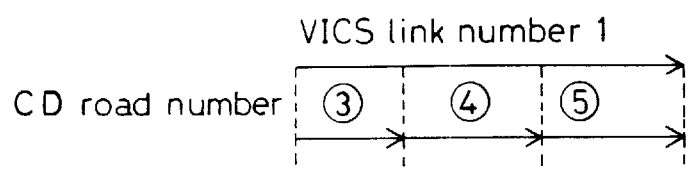
FIG. 4 shows VICS transmitted data as used in the present invention.
FIGS. 5A and 5B are drawings explaining an example of correlation, between road data stored in an information storage unit of the present invention and the VICS transmitted data.

FIG. 4 shows data transmitted from VICS. VICS transmits road traffic information in real time by means of FM multiplex, radio beacon, or optical beacon to each vehicle. FM multiplex transits crude information over a very wide area, while radio beacon and optical beacon provide detailed information for a narrow area within about 10 km in radius around the position where the beacon is installed. The information is received when the vehicle passes through the area around the installed position of the beacon. For each link number assigned to each road, VICS transmitted data include degree of congestion (e.g. closed to traffic, congested, jammed, heavy traffic, normal traffic, etc.), the foremost position of congested section, length of congested section, traffic restriction (construction information, closed to traffic, etc.), and traveling time (time required when running at the predetermined speed). In addition, traffic information may be acquired by making access to the traffic information center (such as ATIS) by means of the data transceiver (such as a portable telephone) 23. In so doing, traffic information can be acquired whenever the user wants to have such information, and the optimal route can be requested based on the traffic information.

Incidentally, the road data of FIG. 3 stored in CD of the information storage unit 3 does not generally correspond at 1:1 to the link number of VICS in FIG. 4, and it is necessary to make them match each other. FIG. 5(A) is a correspondence table, showing how the link number transmitted from VICS corresponds to the link of the road data stored in CD, and FIG. 5(B) is given for explaining such correspondence. Specifically, as shown in FIG. 5(B), CD link numbers 3, 4 and 5 are linked so that the road having VICS link number 1 corresponds to the road numbers 3, 4 and 5 in CD-ROM. The linking mode is not limited to the above, and the link number transmitted from VICS and the road data stored in CD may be coordinated in advance. In this case, a frame for storing the data relating to congestion information of VICS may be provided in the suggested road data shown in FIG. 3, and the data obtained from VICS may be stored in it as the suggested road data.

Figure 6:
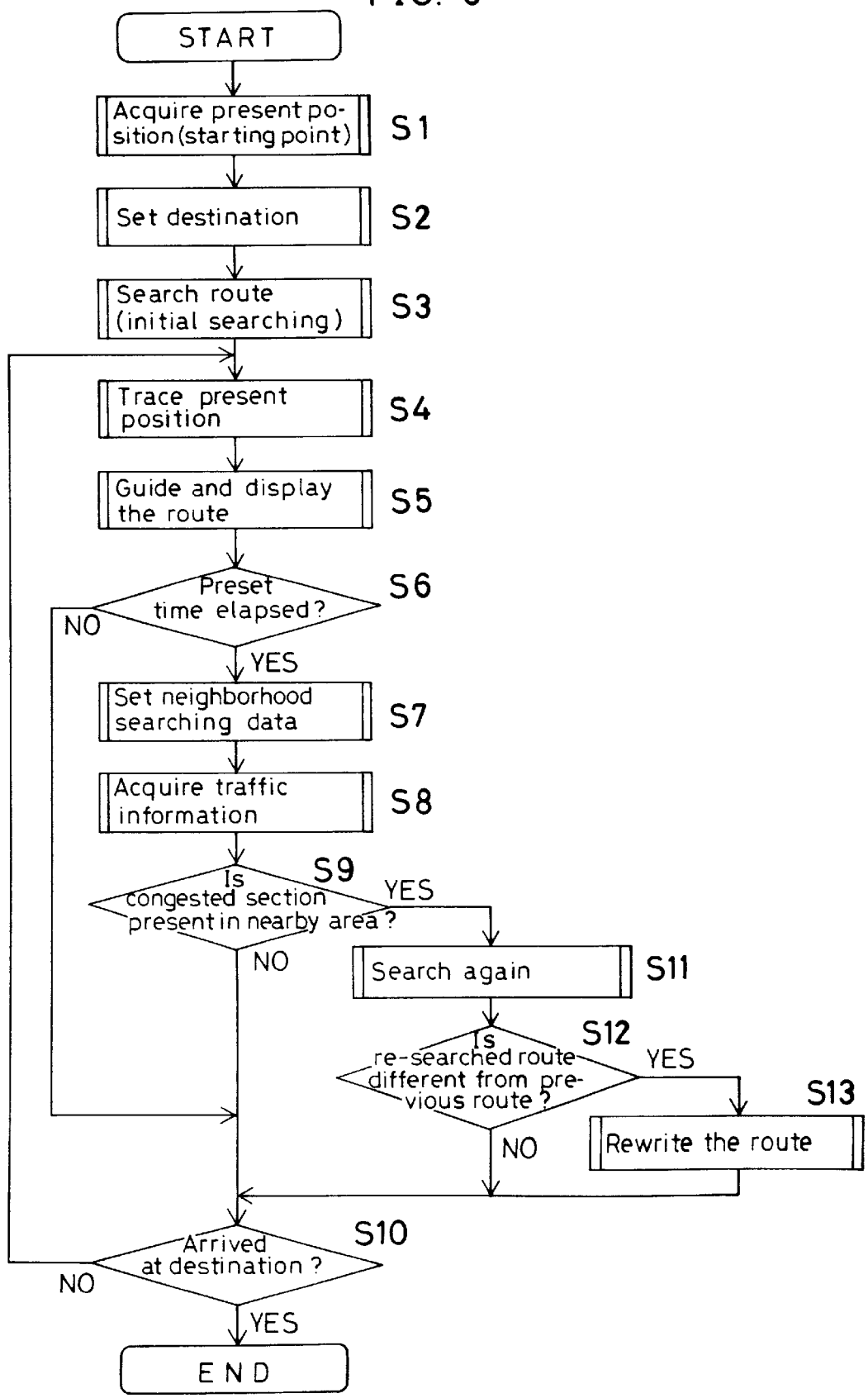
FIG. 6 is a flow chart of a preferred main routine for operation of the overall vehicular navigation system according to the present invention.
Figure 7:
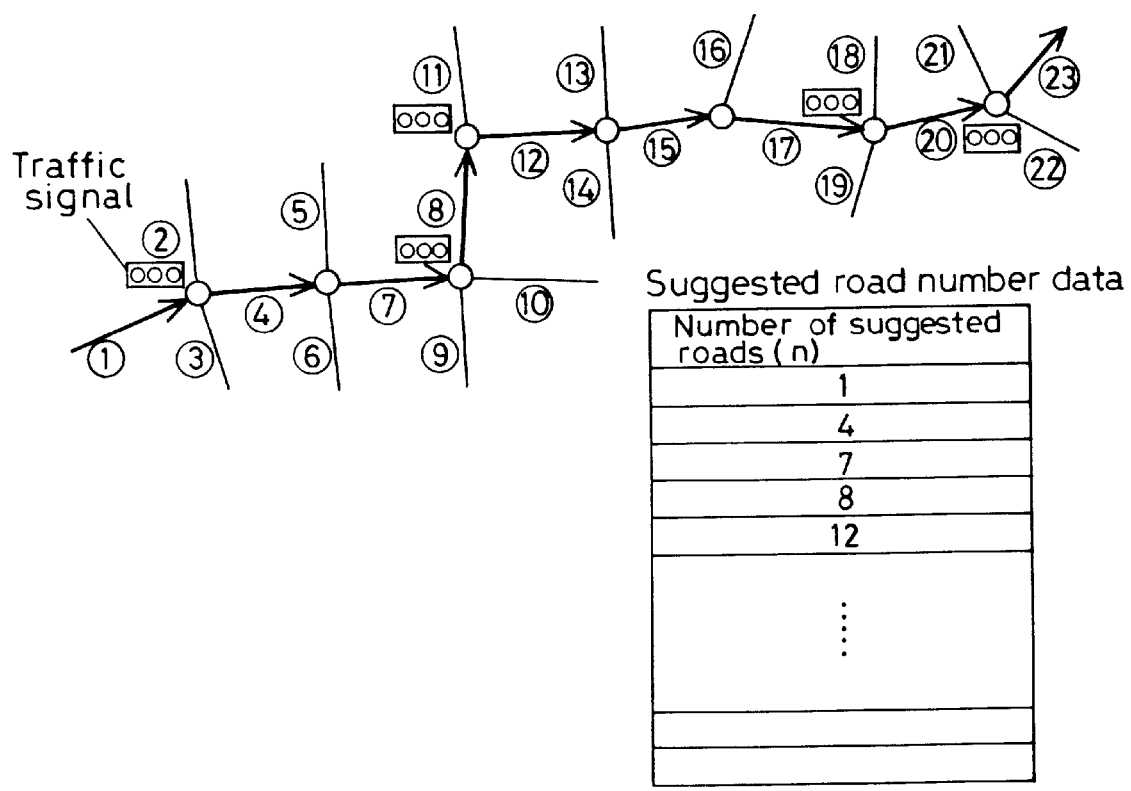
FIG. 7 is a drawing explaining suggested road numbering data acquired by the route searching of the routine of FIG. 6.

FIG. 6 is a flow chart explaining operation of the overall vehicular navigation system of the present invention. When the navigation program is started by CPU 40 of the central processing unit 4, the present position is detected by the present position sensing unit 2. A map of the neighborhood around the present position is displayed, and the present position (starting point) data is acquired (Step S1). Next, the destination is set using telephone number, address, facility name, registered place, etc. (Step S2), and route searching (initial searching) from the present position to the destination (step S3) is carried out. The route to the destination is set as guidance road number data in the form of a road number string for guidance as shown in FIG. 7. When the route is determined, guidance/display of the route to the destination are carried out while tracing the present position by the present position sensing unit 2 (Steps S4 and S5). Next, after the predetermined time has elapsed, processing for the neighborhood searching data setting and traffic information acquisition are performed (Steps S6–S8).

Figure 8:
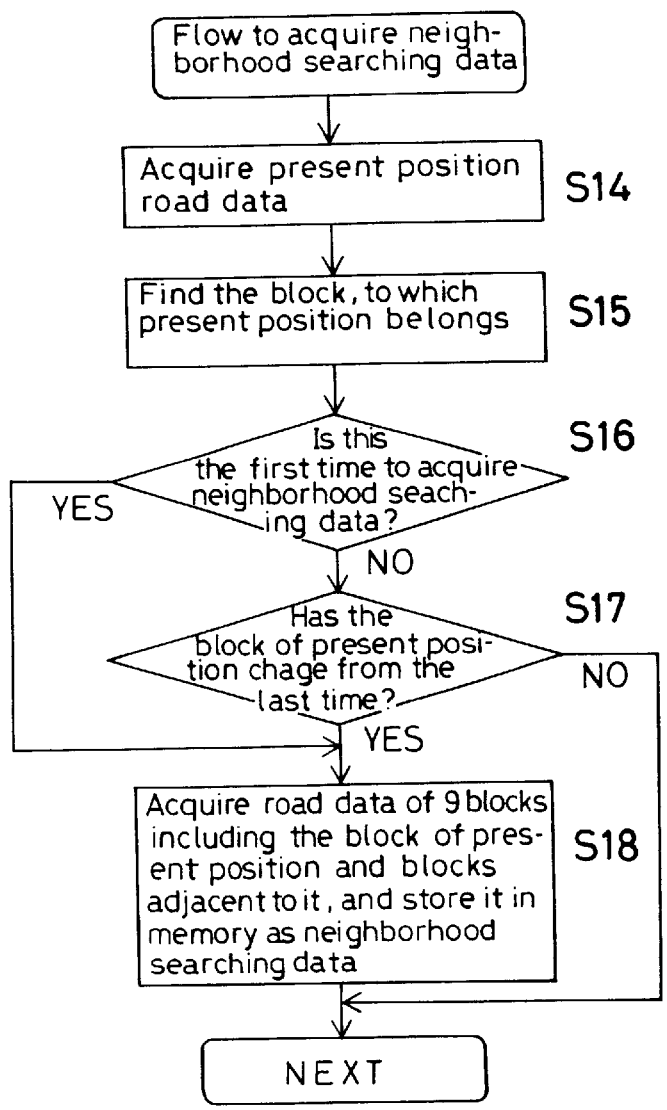
FIG. 8 is a flow chart of a subroutine for setting neighborhood searching data (step S7 in FIG. 6)

FIG. 8 shows a subroutine for processing of the neighborhood searching data setting of Step S7 in FIG. 6, and FIG. 9 is a diagram explaining setting of an area to acquire the neighborhood searching data of FIG. 8. After the road data of the present position of the vehicle has been acquired in Step S14, it is judged which block the present position P (FIG. 9) belongs to, and in Step S16, it is judged whether or not this is the first time to acquire the neighborhood searching data. If it is the first time, it should proceed to Step S18. If not, it is judged whether or not the block of the present position has changed from the last time in Step S17. If not changed, it should proceed to the next processing. If changed, the routine proceeds to Step S18. Then, in Step S18, the road data of the block, to which the present position belongs, and an area BA (FIG. 9) including 9 blocks adjacent to this block is acquired, and it is stored in the memory (RAM 42) as the neighborhood searching data.

The processing in FIG. 8 is to set an area for acquiring the neighborhood searching data to select traffic information corresponding to the neighborhood searching data (to be described later), this technique may also be applied for setting an area to select neighborhood information for searching among the traffic information so acquired. In such case, the suggested road data is changed based on the acquired traffic information prior to searching the route.

Figure 10:
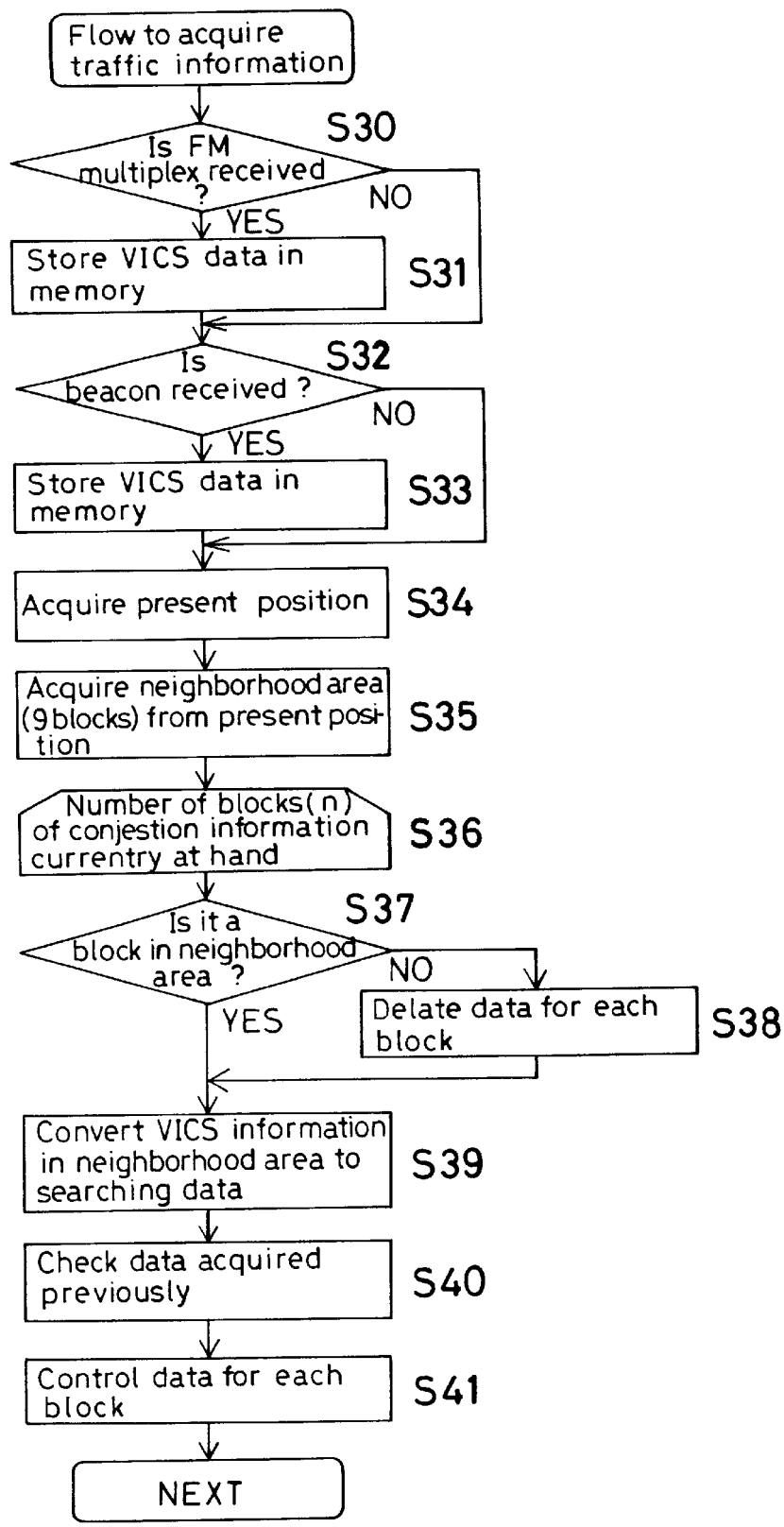
FIG. 10 is a flow chart of a subroutine for acquisition of traffic information of (step S8 of FIG. 6)

Returning to Step S8 in FIG. 6, the processing of VICS traffic information acquisition is carried out. This is explained referring to FIG. 10. In Step S30, it is judged whether or not FM multiplex broadcasting has been received. If received, VICS data is stored in memory, and it is judged whether a beacon signal has been received in Step S32. If received, VICS data is stored in memory. Next, the present position data is acquired in Step S34, and neighborhood searching data for an area BA of 9 blocks near the present position, as explained in FIG. 8 and FIG. 9, is acquired in Step S35.

Next, the number of blocks with VICS congestion information already at hand is acquired in Step S36, and it is judged in Step S37 whether it is a block in the neighborhood area for which blocks have already been acquired. If it is a block in the neighborhood area, the routine proceeds to Step S39. If not, data is deleted for each block. The processing in Steps S36 to S38 are such that, in the case where the congestion information is stored for 4 blocks among the previous 9 blocks, for example, n=4 and those blocks of congestion information overlapped on the current 9 blocks are acquired.

Next, the VICS information for the neighborhood area as set in Step S39 is used to change the suggested road data. If there is congestion information for the road with VICS link number 1 as explained in FIG. 5, a weighted constant $\alpha_1$, $\alpha_2$ or $\alpha_3$ is added to the search cost for a CD link number or it is multiplied by a weighing coefficient to increase the search cost of the road data according to the degree of congestion. More specifically, a distance cost of the road segment corresponding to a CD link number with congestion information is increased. In the case where there is traffic restriction information such as "closed to traffic", the value of $\alpha$ is increased to infinity to make the road not selectable. In the above, cost is changed and data is converted for the suggested road data based on congestion information, while a coefficient may be used to multiply the search cost for road data where congestion information is acquired during execution of route searching.

In general, the search cost is set according to required time for travel, distance, easiness to drive (such as road width, type of road such as national road), and toll for that road (number). Therefore, if the search cost has been set by distance, for instance, the data of easiness to drive such as difference of road width, type of road, etc. are converted to distance. Even when the physical length is the same, the equivalent distance is shorter for an expressway than for a main road, for instance, while the equivalent (weighted) distance is longer for a branch road. In the case where there is congestion information as described above with respect to the converted distance, distance is increased by a constant value or by a multiplying factor and the search cost is increased to make it difficult to select that road from the candidate roads for the optimal route.

Next, the data acquired previously is checked in Step S40. This is to update the congestion information acquired previously and already stored and to make it reflected in the searching. More specifically, for example, in the case where the data acquired previously is detailed information received by beacon and the information acquired this time is crude data required by FM multiplex, the previous data is maintained without updating. Naturally, if the data acquired at this time and the data previously acquired are identical to each other and there is no change in the data, the currently acquired data is considered effective. The data thus acquired is controlled for each block as neighborhood searching data in Step S41.

Figure 11:
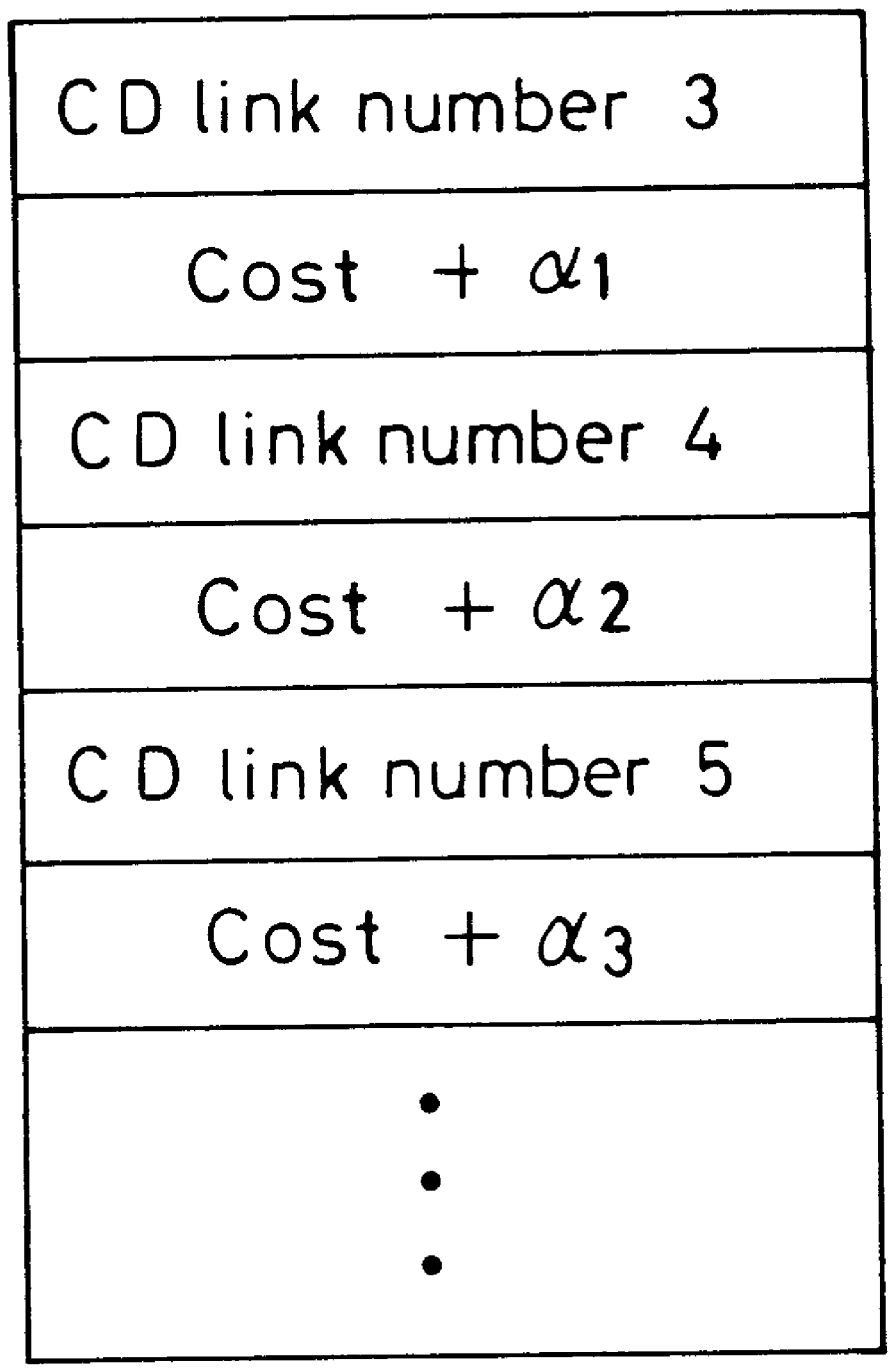
FIG. 11 is a drawing for explaining conversion of searching cost by use of traffic jam information obtained in the subroutine of FIG. 10.
Figure 12:
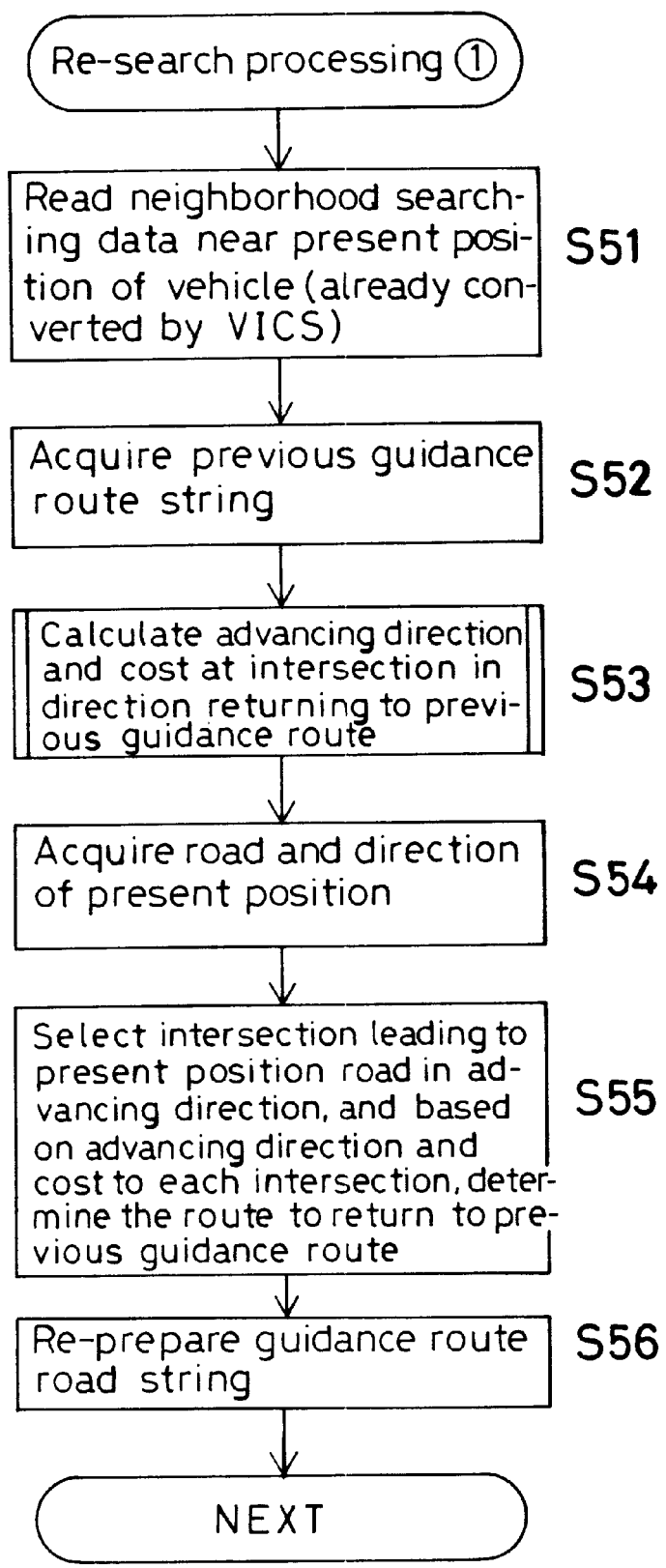
FIG. 12 is a flow chart of a subroutine for a first embodiment of re-search processing (S11 in FIG. 6)

When the above processing of traffic information acquisition has been completed, it is judged whether there is traffic congestion in the neighborhood area set in Step S9 of FIG. 6. If there is no congestion, the routine proceeds to Step S10. If there is congestion, the re-searching of Step S11 is executed. This is explained referring to FIG. 12. First, the neighborhood searching data of the present position of the vehicle is read (VICS conversion data in FIG. 11) in Step S51. The previous guidance route string (guidance road number data of FIG. 7) is acquired, and advancing direction at each intersection in the direction returning to the previously suggested route and the search costs are calculated in Step S53. This is calculated in such a manner as to reduce the search cost of returning roads in the advancing direction, for example. Next, the road and the direction of the present position of the vehicle are acquired in Step S54, and an intersection connected to the road of the present position in the advancing direction is selected in Step S55. Based on the advancing direction to each intersection and the search cost, a route to return to the previously suggested route is determined, and a new suggested route road string is formed in Step S56.

When the above re-searching processing has been completed, it is judged whether or not the re-searched route is different from the previous route in Step S12 of FIG. 6. If not different, the routine proceeds to Step S10. If different, the route should be rewritten. It is then judged whether the destination can be reached or not in Step S10, and Steps S4 to S13 are repeated until the destination is reached.

Figure 13:
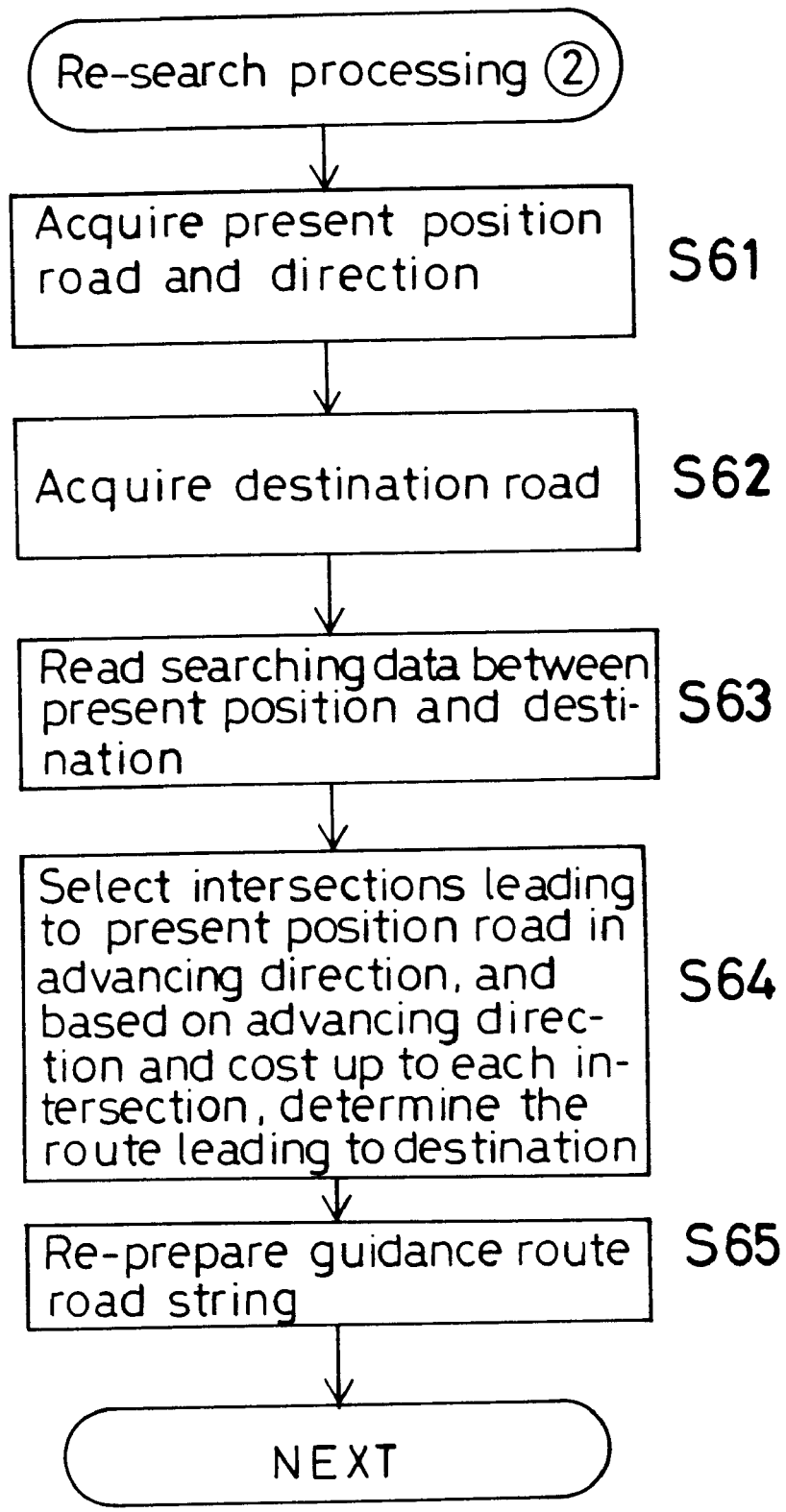
FIG. 13 is a flow chart of a subroutine for another embodiment of re-search processing in the present invention (S11 in FIG. 6)

FIG. 13 is a flow chart of another embodiment of the research subroutine according to the present invention. In the research subroutine explained in FIG. 12, searching is carried out using neighborhood searching data, and a route to avoid traffic congestion ahead on the road may not be searched in some cases. Therefore, in the embodiment shown in FIG. 13, the road and the direction of the present position of the vehicle are acquired in Step S61, and a destination road is acquired in Step S62. Then, road data for the suggested route between the present position and the destination is read in Step S63. In this case, the data converted by VICS is used as the neighborhood searching data, and the data stored in advance is used for the other data. In Step S64, an intersection connected to the road of the present position in the advancing direction is selected. Based on the advancing direction up to each intersection and the search cost, all routes leading to the destination are determined, and a new suggested route road string is prepared in Step S65.

Further, in the case where a route connected to the initial route avoiding traffic congestion and extending in the advancing direction cannot be determined by searching the neighborhood searching data only, the initial route may be maintained on display and may be used as a guidance route, or the area of the neighborhood searching data currently stored may be enlarged. Or, the system may switch over to all-route searching to the destination as shown in FIG. 13.

Figure 14A:
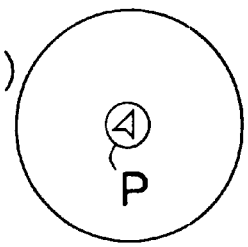
FIGS. 14A, 14B and 14C represent steps in another embodiment of a procedure for setting a neighborhood area.
Figure 14B:
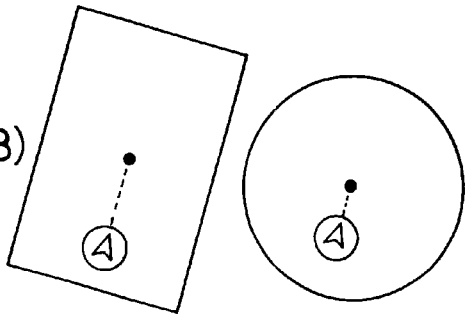
Figure 14C:
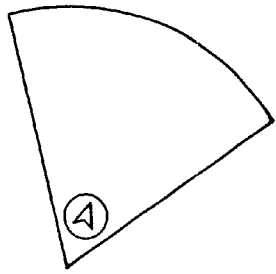

FIGS. 14(A), 14(B) and 14(C) show another embodiment of the procedure for acquiring the neighborhood searching data. If the area is divided into blocks as in the above embodiment, processing can be carried out faster, although there is a difference in the range ahead of the present position as between the upper and the lower portions of the block. In FIG. 14(A), the system attempts to acquire the data within a given distance from the present position. More specifically, such data is acquired, in which coordinates of the terminal point (either the starting point or the end point, or both) and coordinates of the present position are within a given distance. In FIG. 14(B) priority is given to searching in an area ahead in advancing direction (because the vehicle is rarely driven backward), and the position serving as reference in form of rectangle or circle is set within a given distance from a point ahead of the present position. More specifically, a point ahead in the advancing direction by a given distance (in straight line) from the present position, is used as a reference point for setting the search area. In FIG. 14(C), based on the advancing direction of the present position, data for a fan-shaped area extending through a given angle is acquired.

Figure 15A:
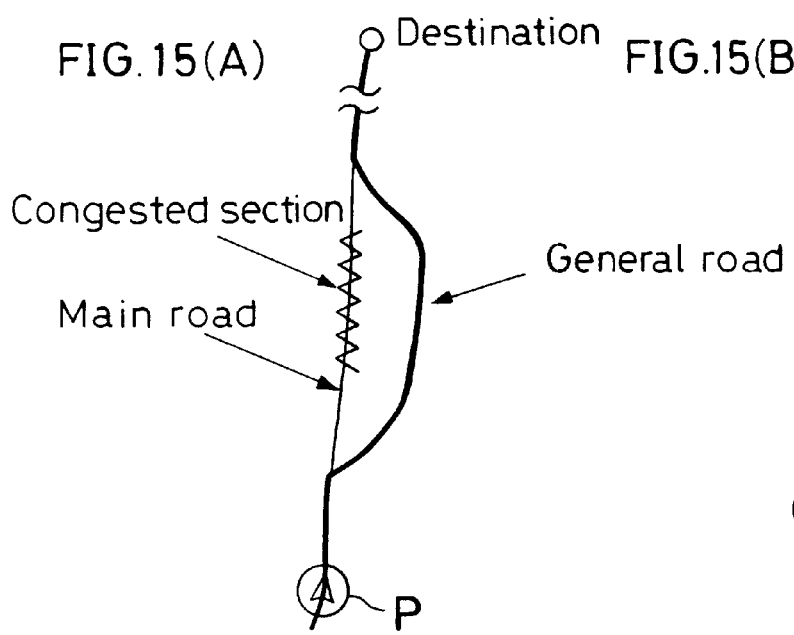
FIGS. 15A and 15B are maps representing detours generated in accordance with the present invention.
Figure 15B:
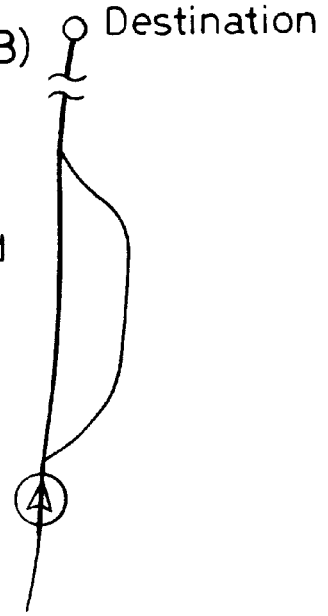

FIGS. 15(A) and 15(B) further illustrate the present invention. As shown in FIG. 15(A), in the case where data indicating traffic congestion on the main road has been received and a bypassing route on a general road (thick line) has been identified by re-search as the optimal route, and if additional information is later received which indicates that traffic congestion on the main road has dissolved by the time the vehicle P has advanced to the position shown in FIG. 15(B), the main road can be re-searched and suggested as the optimal route.

It is needless to say that the present invention is not limited to the above embodiments, and various changes can be made. For example, the acquisition of traffic information in Step S8 of FIG. 6 may be carried out after the setting of the destination in Step S3. Also, while setting of the neighborhood data and acquisition of traffic information are carried out at a given time interval in Steps S6 to S8 in FIG. 6, these steps may be carried out at a point preceding a branch point of an intersection by a given distance. When traffic congestion has been detected in a nearby area in Step S9 of FIG. 6, the information may be announced by audio output or screen display, or when the present route has been changed in Step S13, the change may be announced by audio output or screen display. In so doing, the user can be accurately advised of changes in traffic information or information such as a route change.

In the above embodiments, programs such as navigation programs for carrying out the present invention are stored in an external storage unit, and the programs are read into flash memory in the central processing unit to execute the various routines; however, the programs may be stored in ROM in the central processing unit.

Further, in the above embodiments, in case information by VICS is utilized, the information transmitted from a VICS center is updated at a given time interval. Therefore, VICS information may be received at a given time interval to match the above timing.

Also, the system may be designed in such manner that traffic information can be acquired when data for a road with very changeable traffic conditions (e.g. expressway or main road such as national road) is added in advance to the suggested road data and such road is present in the area for which data is currently acquired.

Further, in the above embodiments, initial searching is carried out in Step S3 of FIG. 6, and the route determined by that initial searching is regarded as a suggested route; however, the route may be inputted manually. Also, traffic information may be added or may not be added to the initial searching. In the case where route searching is carried out by connecting the system with a home television set and the system is then used as a vehicular navigation system, and if some time is required until route guidance is started after the initial searching, the system may be designed in such manner that initial searching is carried out without adding traffic information,. and after it is judged that the route guidance has been started upon initiating driving of the vehicle, the traffic information may be added and route searching may be carried out as described in the above embodiments.

Next, a variation of the present invention will be described referring to FIGS. 16 to 24. This variation relates particularly to a vehicular navigation system, by which it is possible to locate a filling station or a convenience store near the present position of the vehicle by inputting the intended purpose and by searching to identify an optimal route passing by the searched facility by considering road conditions such as traffic congestion information acquired from a remote source.

Using such a vehicular navigation system, it is possible to calculate the route from the present position to the destination utilizing external information and to determine the optimal route from a plurality of routes thus calculated. It is sometimes desired to identify facilities for obtaining fuel or food and drink on the way to the destination using a vehicular navigation system. In such case, it is necessary to search to locate a facility for each intended purpose. Such a search may fail to locate a candidate facility on the route or a located facility may be at a point reached only by deviation from the suggested route. When it is necessary to deviate from the suggested route to go to the facility, re-searching is carried out to find a route having such facility as a transit point. A vehicular navigation system having such a function is proposed, for example, in JP-A-2-3899.

For example, when it is desired to stop at a filling station on the way, the user must select a facility from a plurality of filling stations, and the selected station must be set as a destination. In the case it is set as a transit point, the user may not be able to obtain information on the filling station selected as optimal because dynamic information (such as traffic congestion) for the road is not available. Accordingly, even when the user can drive the vehicle smoothly from the present position to the filling station, the user may encounter trouble if there is a traffic jam on the route from the filling station to the destination. Or, the restaurant as originally selected may be closed because of a holiday or because not in its business hours, and re-searching must be carried out, or the restaurant may be too crowded and much time may be required for waiting. In this way, unless business information for the selected facility is available, the user may waste much time and may arrive at the destination much later than originally expected.

It is an object of the present variation of the invention to provide a vehicular navigation system by which it is possible to guide the vehicle along the optimal route to the destination by setting the selected facility to visit on the way as a transit point and by considering road conditions acquired from a remote source.

It is another object of the variation of the present invention to provide a vehicular navigation system by which it is possible to guide to the destination along the optimal route by setting the selected facility to visit on the way to the destination as a transit point and by considering road conditions acquired from a remote source, and by adding information relating to the selected facility.

To attain the above objects, a variation of the present invention includes a destination setting means for setting a destination, an intended purpose inputting means for inputting an intended purpose for a stop in travel, a first memory means for storing map information and guidance information, a second memory means for receiving and storing road conditions such as traffic congestion information, a present position sensing means for sensing the position of the vehicle, a facility searching means for searching near a facility search base point based on the intended purpose inputted by the intended purpose inputting means, and a first correlation quantity calculating means for searching for a route from the present position to the facility by taking into consideration information stored in the second memory means with respect to a facility searched by the facility searching means and for obtaining a correlation value for said route, a second correlation value calculating means for searching for a route from the facility to the destination by considering outside information stored in the second memory means with respect to the facility searched by the facility searching means and for obtaining a correlation value for said route, and a facility determining means for determining the facility based on calculated correlation values obtained by the first and the second correlation value calculating means.

In another variation the present invention includes a destination setting means for setting a destination, an intended purpose inputting means for inputting the intended purpose of a stop in travel, a first memory means for storing map information and guidance information, a second memory means for receiving and storing road conditions such as traffic congestion as information from an outside source, a third memory means for storing facility information relating to suggested facilities, a present position sensing means for sensing the present position of the vehicle, a facility searching means for searching the facility information for facilities near a facility search base point based on the intended purpose input by the intended purpose inputting means to identify a facility, a first correlation value calculating means for searching for a route from the present position to the identified facility by considering outside information stored in the second memory means and using the information relating to the suggested facility stored in the third memory means as a judging condition with respect to the facility searched by the facility searching means and for obtaining a correlation value for said route, a second correlation value calculating means for searching for a route from the facility to the destination by considering outside information stored in the second memory means and using the information relating to the suggested facility stored in the third memory means as a judging condition with respect to the facility searched by the facility searching means and for obtaining a correlation value for said route, and a facility determining means for determining the facility based on the calculated value obtained by the correlation value calculating means.

The foregoing variation of the invention may further include a searching condition inputting means for inputting a searching condition such as a facility searching base point, and the facility searching means would then search to locate a suitable facility based on the searching condition input from the searching condition inputting means.

By the above arrangement, it is possible to search for a facility corresponding to the intended purpose based on guidance information stored in advance by the facility searching means when the intended purpose is inputted by the intended purpose inputting mean, when the user wants to go to a facility such as a filling station, a convenience store, etc. on the way to the destination. Also, it is possible to calculate a correlation value for travel from the present position to the facility and for travel from the facility to the destination by considering road conditions such as traffic jam information acquired by the first and the second correlation value calculating means and by adding information relating to the selected facility to the road conditions. Further, the facility determining means determines the optimal facility from the calculated correlation value. In the case where the searching condition inputting means is provided, the present position or the destination can be set as the facility search base point, or the time required can be set, and the optimal route searching can be carried out.

According to the foregoing variation of the invention, the user can arrive at the facility within a short time on the way from the present position to the destination without making a selection himself because the route with the shorter time required is determined by search and suggested when the user wants to visit such facility on the way to the destination.

In the present system, an estimated position can be calculated based upon various types of sensor signals and GPS data for sensing the present position of the vehicle, and the present position is determined by finding the position on the road through correlation of the estimated position and road and GPS data on a map. Also, the present system is provided with capability to judge whether the vehicle is approaching the suggested point already set with respect to the position of the vehicle. Specifically, timing for intersection information display output data, such as distance before the intersection on the suggested route, automatic audio output such as intersection passing judgment, or passing intersection name, is judged. Based upon the results of the judgment, guidance commands are issued to the image processor and the audio processor. When the request signal is input, audio guidance related to the present position is issued to the audio processor. In the audio guidance of the present system, audio data read from the information storage unit 3 (phrase, sentence, sound, etc. put together) are synthesized and are converted to analog signals for output from the audio output unit.

Figure 16:
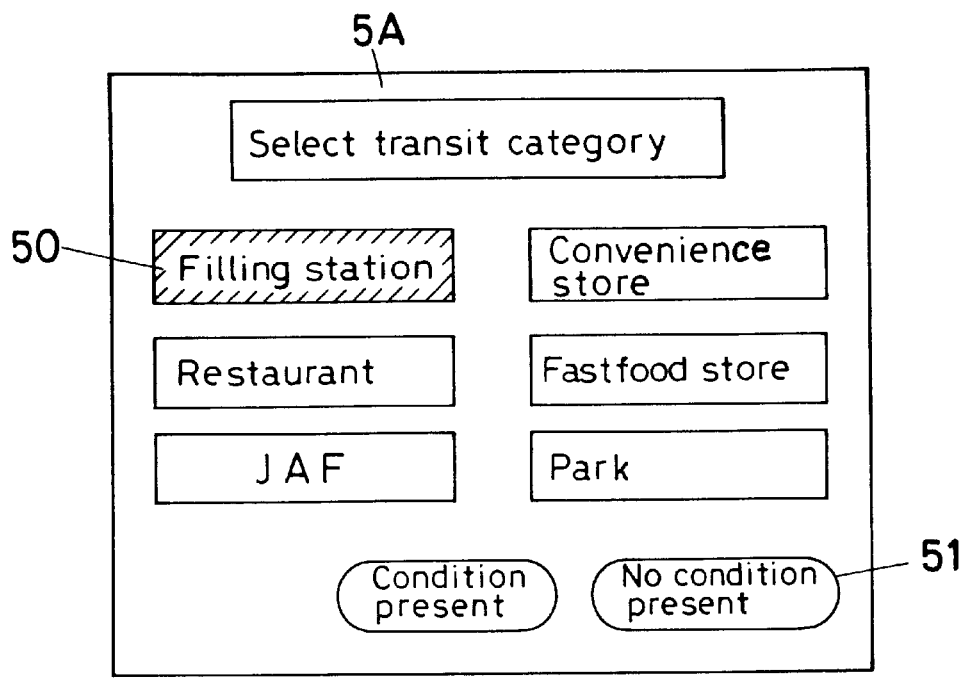
FIG. 16 shows an example of a route category selection screen.

Next, the structure and operation of the electronic control unit for executing a search for an optimal route, with a facility to visit on the way as a transit point, will be described with reference to FIG. 16 which represents an example of a category selection screen and FIG. 17 which shows an example of a search condition inputting screen.

A selection screen SA comprises a selection key 50 for selecting a facility classified for the intended purpose, and a search condition specifying key 51 for specifying whether or not a search condition to the selected facility is set. When the category of the facility is selected on the selection screen and the column "no searching condition" is specified, searching of the facility is started based on the facility search base point determined in advance (normally, the present position). When the category of the facility is selected and the column "searching condition present" is specified, the searching condition input screen as shown in FIG. 3 appears. On the searching condition input screen 6A, there are provided a facility search base point specifying key 60 for specifying a point around which searching of the facility is to be conducted, and a designation specifying key 62 for specifying a required time of arrival at the facility to be utilized. In the present example, a filling station with a designation "JOMO" has been selected near the destination within 30 minutes from the present position.

Figure 18:
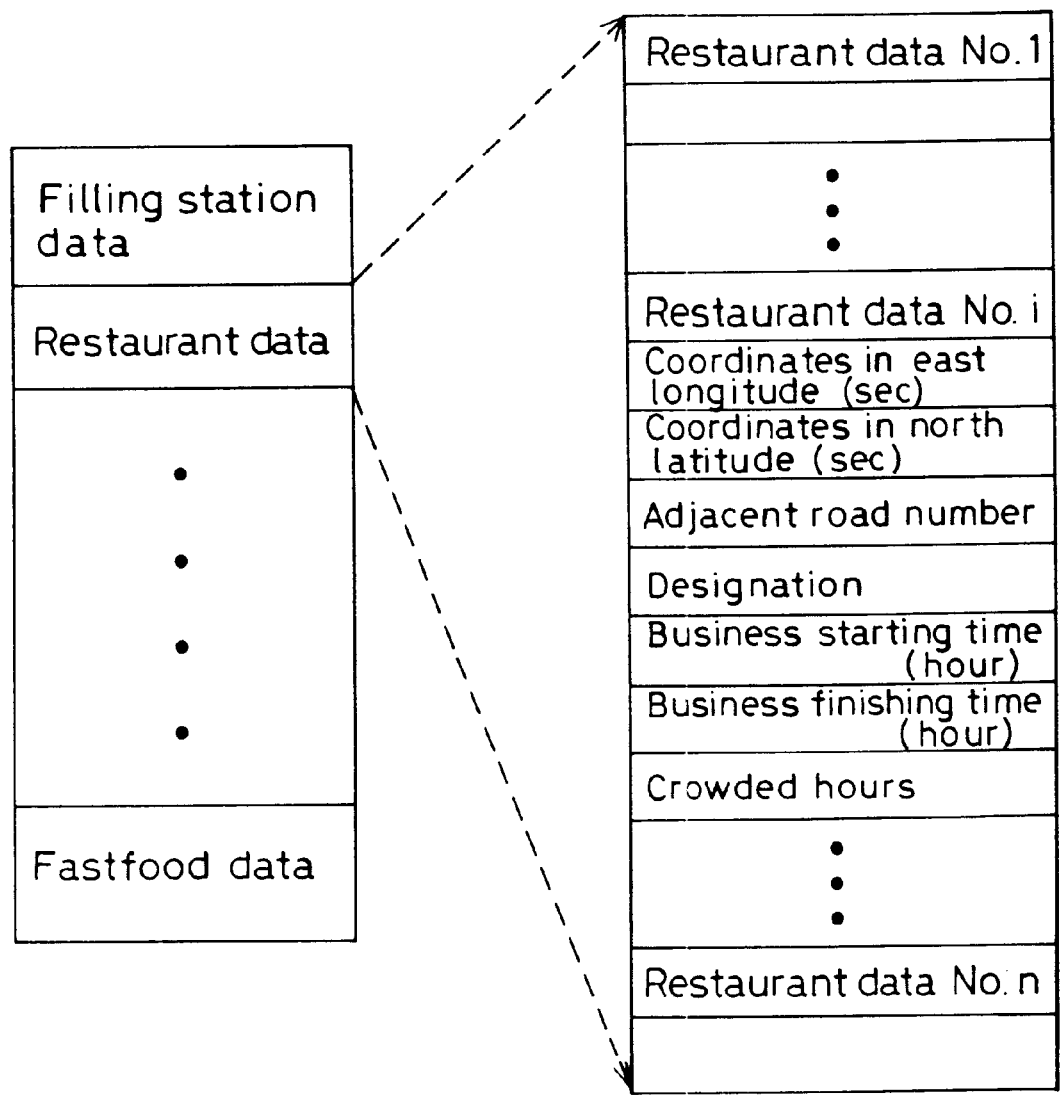
FIG. 18 illustrates facility data as registered for each category.

When the user wants to visit a filling station or a convenience store while driving to the destination, and if the facility is selected on the screen and the searching condition is set, it is possible to search for a facility near the facility search base point, such as the present position of the vehicle, and to search for an optimal route to the destination via such facility. This route searching is executed by taking the received road condition data into account. The facility searching data include facility name data, position (coordinate) data, road data, designation data, business data, etc. for each facility classified by category as shown in FIG. 18. As the business data, data such as business day, business starting time, business termination time, crowded hours, etc. are included. In searching the facility having the above business data such as a restaurant, it is possible to exclude the facilities closed for business in accordance with their business hours or currently in their crowded hours or to give information on average waiting time at the facility when a facility with crowded business hours is included in the candidate facilities.

In the utilization of such business data, the driving time to the selected facility is obtained to determine expected time of arrival at the selected facility based on the driving time and the present time. By comparing and calculating the expected time of arrival and business data, the procedure of processing for the facility is determined based on the conditions. Specifically, from the results of calculation, it is judged whether the expected time of arrival falls within the crowded hours or within business hours, and the facilities not complying with these conditions are exempted. Or, if it is within the crowded hours, the driver will be notified of that fact and can judge whether to go there or not.

In particular, it is possible to store such information as internal information in the information storage unit 3 provided in the system shown in FIG. 2, or to receive the information by the data transceiver 23 in the present position sensing unit 2 from the information center, for example, and to store the thus received information in a non-volatile memory as outside information. By acquiring such variable information from an external source, it is possible to rewrite the data regularly and to search for a facility based upon the most up-to-date data.

Based on the selected category, a search is conducted for facilities within a given distance from the facility search base point, and route searching is carried out by taking information such as road conditions, business information, etc. into account. From these facilities, the optimal facility to suit the searching condition is determined. In this case, a correlation value is obtained for the route from the present position to the facility and from the facility to the destination. For the correlation value, a weighted value is adopted based on the values relating to the time from the present position to the facility and the time from the facility to the destination and physical road conditions such as road type, number of lanes, number of traffic signals, right turn, left turn, etc.

Figure 19:
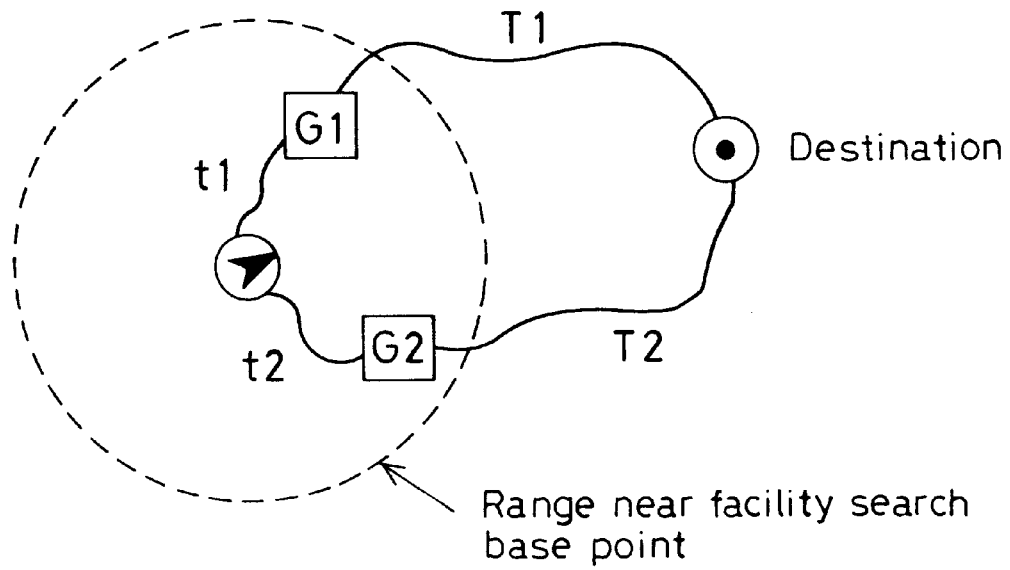
FIG. 19 is a map illustrating an optimal route searching mode for locating a route passing through a utilization facility.

The concept of route searching using the required time as a correlation quantity will now be described referring to FIG. 19. In the following, the present position is used as the facility search base point. When facilities are found, the system searches for an optimal route to the destination via the facility selected as the optimal facility from among all the related facilities. For example, for facilities G1 and G2, the time t1 required from the present position to the facility G1, the time t2 to the facility G2, the time T1 from the facility G1 to the destination, and the time T2 from the facility G2 to the destination are obtained. The optimal facility is selected based on the time required to go to the destination via the facility G1 (t1+T1) and the time required to go to the destination via the facility G2 (t2+T2). It is possible to automatically select the facility based upon the preset condition from the facilities G1 and G2 or to select the facility from display of a route via the facility G1 and a route via the facility G2 on a map screen.

Figure 22:
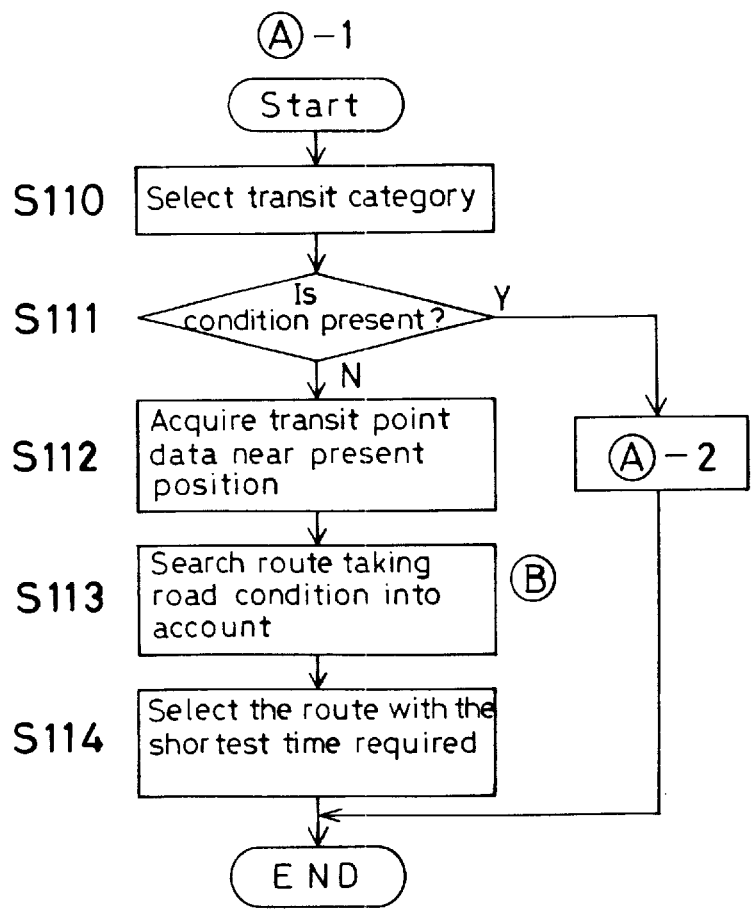
FIG. 22 is a flow chart showing a subroutine (A-1) for optimal route searching (step S104 of the main routine of FIG. 21)
Figure 23:
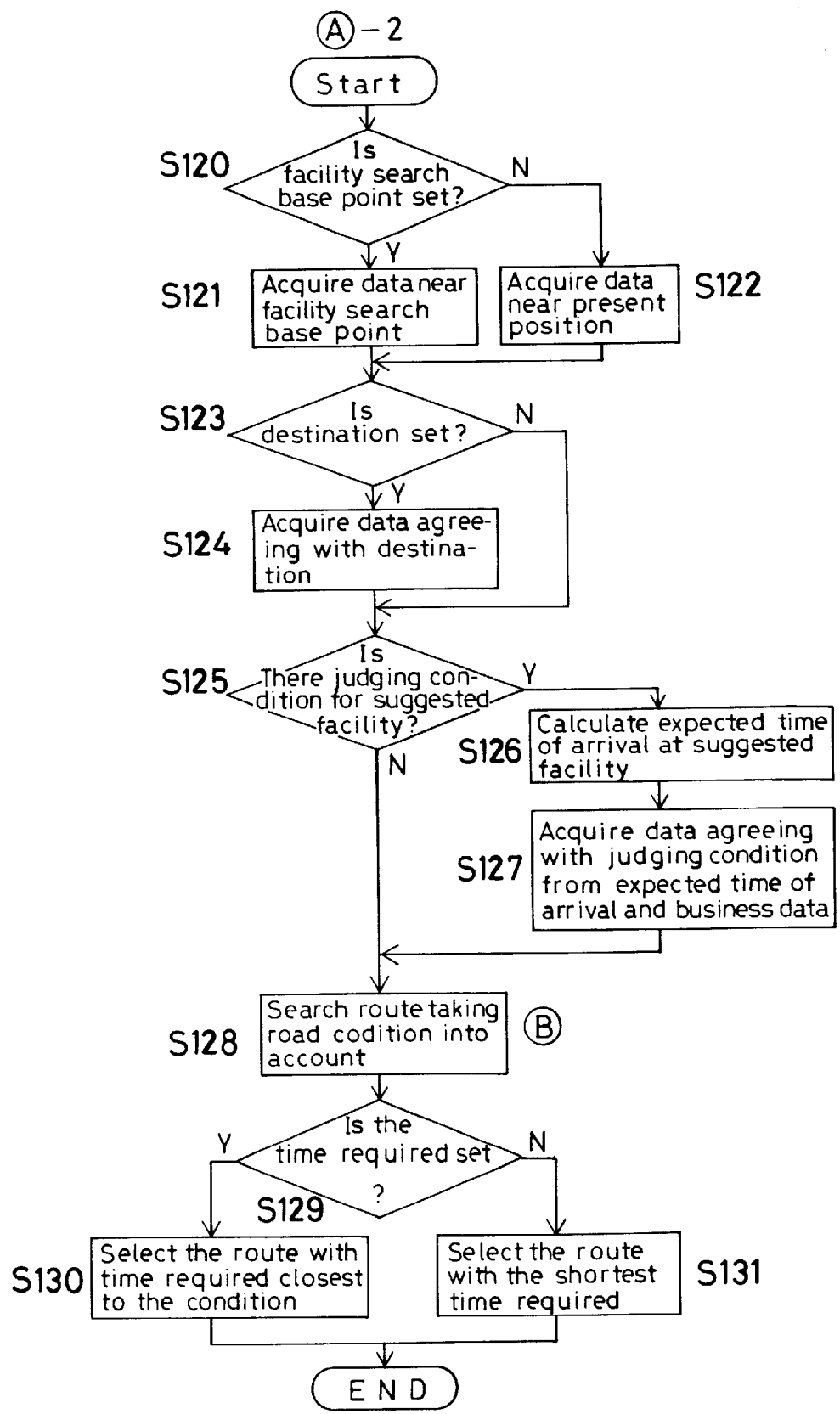
FIG. 23 is a flow chart of a subroutine (A-2) for setting the searching conditions for the subroutine (A-1)

The processing procedure of the foregoing variation will now be described with reference to FIG. 21 which shows a main routine and FIG. 22 which represents a subroutine for optimal transit searching. FIG. 23 shows a subroutine for route searching, taking road conditions into account.

Figure 21:
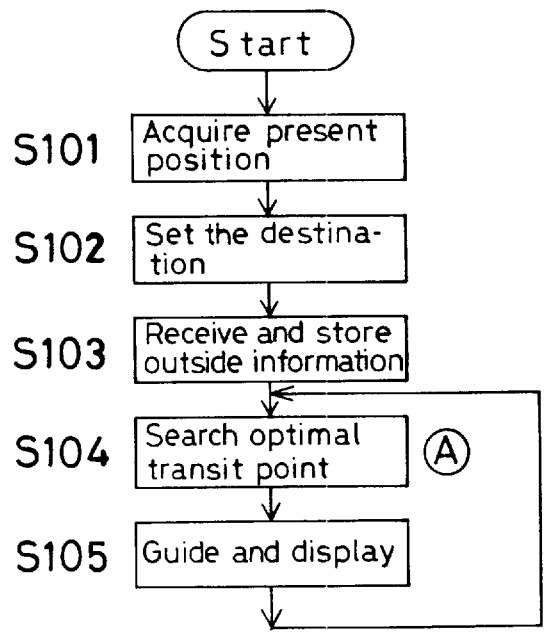
FIG. 21 is a flow chart of a main routine of processing from route searching to route guidance according to another embodiment of the present invention.

In FIG. 21, acquisition of the present position (S101), setting of a destination (S102) and information on road conditions are acquired, and these are stored in memory (S103). Based on the thus acquired and stored information, the optimal transit route passing through the facility (transit point) is searched (S104), and the searched route is suggested and displayed (S105). By the optimal transit route searching in Step S4, the routine (A-1) shown in FIG. 22 is started. Then, the category selection screen shown in FIG. 16 is displayed, and a transit point, e.g. a filling station, is selected on this screen (S110). Then, it is specified whether or not a searching condition has been set (S111). A searching condition is present when a searching condition such as a searching point, destination, required time, etc. has been set on the searching condition input screen. The searching condition may be designation of a facility search base point (present position, destination), destination required time (e.g. time in minutes), time (e.g. time in minutes after the present moment), etc. In case the time in minutes after the present moment is specified, a facility located at the closest point and attainable within the specified time (time of arrival) is searched. If there is no searching condition, transit point data near the present position (data of G1 and G2 in FIG. 19) are acquired (S112). Based on the transit point data, route searching is carried out by taking road conditions into account (S113), and the route with the shortest time required is selected (S114).

When a searching condition is specified in Step S111, the optimal route searching routine (A-2) is started. In S120 it is judged whether or not the facility search base point is set as the searching condition specified in Step S111. If already set, the data near the facility search base point is acquired (S121). If not yet set, the data near the present position is acquired (S122). Next, it is judged whether or not the destination is set (S123). If the destination is already set, the data agreeing with the destination is acquired from the data found in Steps S121 or S122 (S124). Next, it is judged whether or not judging conditions for the suggested facility (such as business hours, crowded hours) are present (S125). If no such condition has been set, the optimal route is searched, taking road conditions into account (S126). From the expected time of arrival and business data, the data agreeing with the judging conditions is acquired (S127), and the optimal route is searched, taking road conditions into account (S128). Here, it is judged whether or not the required time has been set as the searching condition (S129). Based on the result, the route is selected. Specifically, in the case where the required time has been set, the route with the required time closest to the condition is selected from the candidate searched routes (S130). On the other hand, in the case where the required time is not set, the route with the shorter required time is selected (S131).

In the present variation, route searching is carried out based on the data acquired in Step 127. In the case where judging conditions for the suggested facility depend upon selection by the driver, the following steps are added: a step to notify lack of agreement with the judging conditions, and a step to select whether or not route searching including said data should be carried out.

Figure 24:
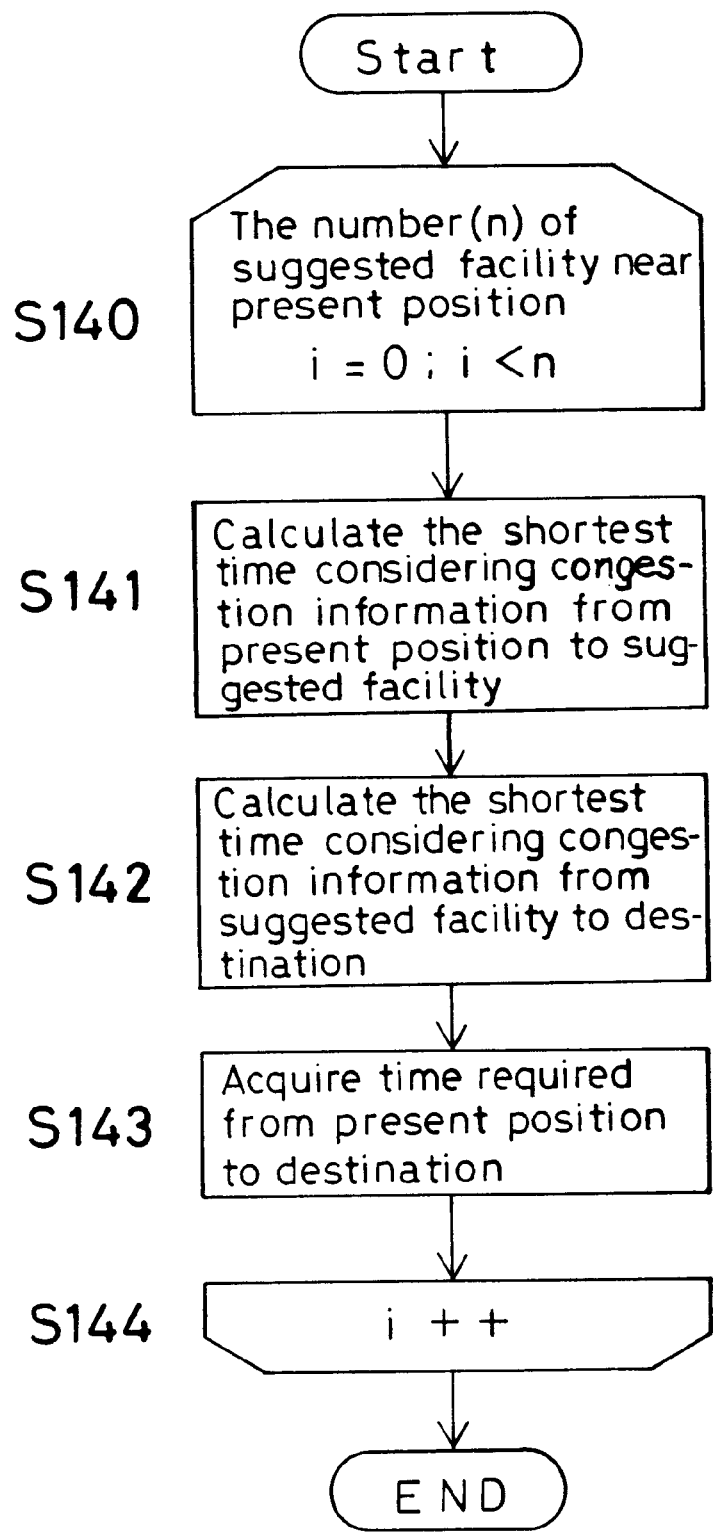
FIG. 24 is a flow chart of a subroutine (B) for route searching by taking road conditions of the subroutine (A-1) into account.

For route searching taking road conditions into account (Step S113), the subroutine shown in FIG. 24 is executed. The number (n) of the candidate facilities, e.g. filling stations, near the present position or near the already set facility search base point is set in advance (S140), and the shortest time from the present position to that facility is calculated by taking congestion information as a road condition into account (t1 and t2 in FIG. 19) (S141). Taking congestion information for the route from the suggested facility to the destination into account, the shortest time (T1 and T2 in FIG. 5) is calculated (S142). The time required from the present position to the destination is acquired (S143). This calculation of time is carried out for a given number (n) of transit points (suggested facilities) among the candidate facilities near the present position (S144). In the above variation, while "the time required" is used as the selecting condition after route searching, alternatively the time of arrival at the suggested facility may be selected.

In the foregoing embodiment of the invention, the following variations can be adopted:

(1) If there are a relatively great number of candidate facilities, many facilities will be searched if the search has a wide range. On the other hand, if there are relatively few facilities, searching may fail to locate a specified facility if the search has a narrow range. Thus, the searching results may vary according to the extent of the range of searching, and it is preferable to provide that the searching range can be enlarged or reduced. As a result, by reducing the searching time, it will be much easier to set the facility to be utilized.

Figure 20:
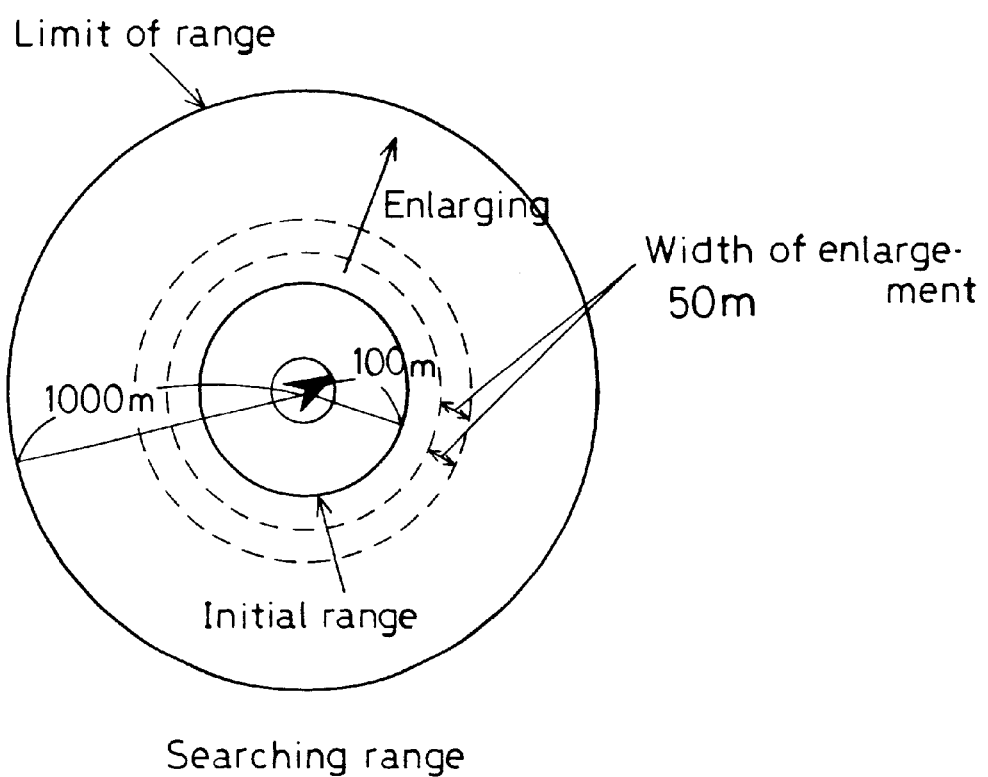
FIG. 20 is a map illustrating determination of a searching range.

Describing the method to determine the searching range in connection with FIG. 20, it is supposed that radius of a circle for searching is 100 m around the present position, that the increment of radius enlargement is 50 m, and that the limit of the enlarged range is 1000 m. The limit of the range can be obtained by setting the predetermined value as the initial value or it can be obtained from the distance between the present position and the destination. When the limit of the range is exceeded, the center of the range may be switched over from the present position to the destination, or a message such as "no candidate facility in the neighborhood" may be displayed.

(2) It is possible to set the searching range in a circular, elliptical or semi-circular shape as desired. In particular, in the case where an elliptical or semi-circular shape is selected, it can be provided that the facilities on the opposite side of the destination may not be set by reducing the searching time and by limiting to only the facilities located in the direction toward (i.e. before) the destination.

(3) The searching method can be designed to enlarge the searching range by increments of 50 m in radius until the optimal facility is found as described in (1) above and the searching is terminated when it is found.

(4) Another method is to search up to the limit of range and to find a route having the optimal facility as a transit point on the way.

(5) To reduce the searching time, it is effective to provide that the selecting conditions such as specified facility name, proximity to the present position or the destination, etc. are automatically or manually set before or after the searching, or that the number of searches or searching time is limited. In the case where the number of searches is limited, priority is given to the searching range. For example, if the number of searches is limited to n=20, and if this number of searches is exceeded when the searching range is enlarged, the enlarging of the searching range is stopped at that point. In particular, when the candidate facilities are automatically selected, the burden on the user can be reduced, and the user can concentrate attention on driving. When all processing are automated, working time can be reduced, and information such as road conditions, business information, etc. can be handled closer to real time.

(6) In selecting the candidate facilities, for example, four routes may be displayed including the specified filling station (specified before searching), a facility near the present position, a facility near the destination as intermediate candidates, and the optimal facility is selected from among these candidates. Or, about 10 routes may be displayed starting from the route with the shortest required time, and the optimal facility may be selected from these candidate routes depending upon the conditions such as the specified filling station, position, etc.

Figure 17:
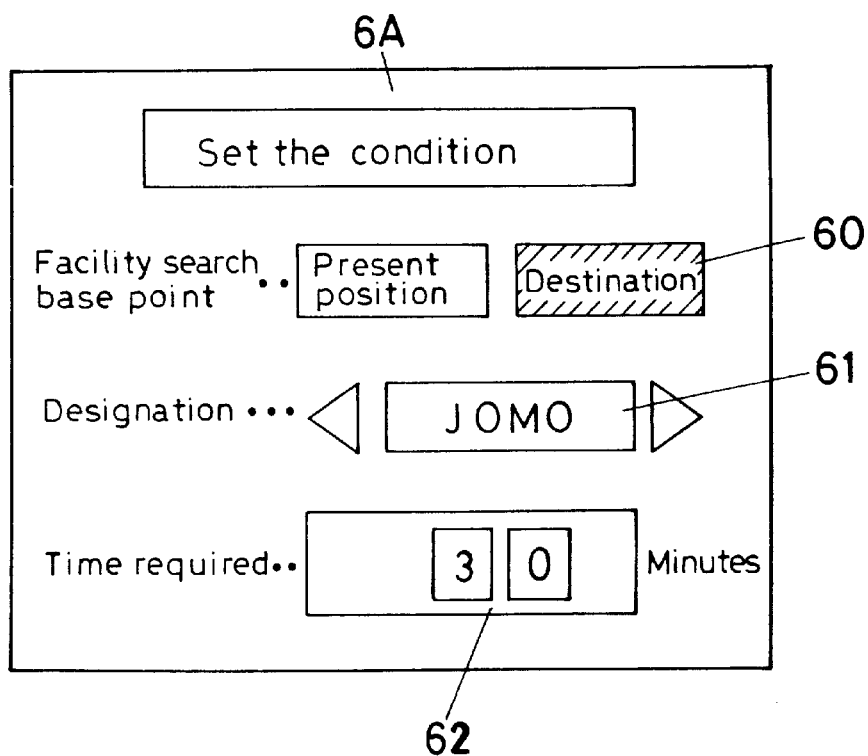
FIG. 17 shows an example of a searching condition input screen.

(7) In choosing the facility search base point shown in FIG. 17, an arbitrary point on a map display may be set by use of a cursor.

What is claimed is:

1. A vehicular navigation system for determining an optimal route for travel of a vehicle to a destination comprising:

present position determination means for determining present position of the vehicle;

an information storage unit for storing road data for searching for the optimal route;

traffic information acquiring means for acquiring current traffic information;

area setting means for setting an area as a given range from a location at or near the present position of the vehicle; and route searching means for identifying, from among the stored road data, road data pertaining to the set area, for selecting, from among the acquired current traffic information, traffic information corresponding to the identified road data, for changing the identified road data in accordance with the selected traffic information and for searching the road data, inclusive of the changed road data, to determine the optimal route.

2. A vehicular navigation system according to claim 1, wherein said traffic information is acquired at a given time interval.

3. A vehicular navigation system according to claim 1, wherein said road data is divided into a plurality of blocks in storage, and said area is set in the form of a number of said blocks.

4. A vehicular navigation system according to claim 1, wherein said set area is within a given distance from the present position of the vehicle.

5. A vehicular navigation system according to claim 1, wherein said set area is within a given angle from the present position to the advancing direction.

6. A vehicular navigation system according to claim 1, wherein said set area is within a given distance from a point located ahead of the present position by a given distance and in a given direction.

7. A vehicular navigation system according to claim 1, wherein said route searching means adds a searching cost to the road data and changes the searching cost of the identified road data in accordance with the selected traffic information.

8. A vehicular navigation system according to claim 1, wherein said route searching means searches for a new optimal route responsive to acquisition of traffic information corresponding to the identified road data.

9. A vehicular navigation system according to claim 1 further comprising means for notifying a driver of the vehicle that traffic information corresponding to the identified road data has been acquired.

10. A vehicular navigation system according to claim 1 further comprising means for notifying a driver of the vehicle that the optimal route has been changed.

11. A vehicular navigation system for determining an optimal route for travel of a vehicle to a destination comprising:

present position determination means for determining the present position of the vehicle;

an information storage unit for storing road data for searching for the optimal route;

traffic information acquiring means for acquiring current traffic information;

area setting means for setting an area as a given range from a location at or near the present position of the vehicle;

neighborhood data acquiring means for acquiring neighborhood road data for said set area;

neighborhood data memory means for storing said acquired neighborhood road data; and route searching means for selecting, from among the acquired current traffic information, traffic information corresponding to the neighborhood road data, for changing the neighborhood road data in accordance with the selected traffic information and for searching the road data, inclusive of the changed neighborhood road data, to determine the optimal route.

12. A vehicular navigation system according to claim 11, wherein said neighborhood searching data is acquired and updated at a given time interval.

13. A vehicular navigation system according to claim 11 further comprising guidance output means for outputting guidance for travel of the optimal route and wherein said route searching means searches only the neighborhood road data to locate, as a new optimal route, a route connecting with a previous optimal route from the present position, and if the new optimal route is located, said guidance output means outputs guidance for the new optimal route and if the new optimal route is not located, said guidance output means outputs guidance for the previous optimal route.

14. A vehicular navigation system according to claim 11 further comprising guidance output means for outputting guidance for travel of the optimal route and wherein said route searching means searches for a new optimal route, based on only the neighborhood road data, to locate a new optimal route connecting to a previous optimal route from the present position and if the new optimal route is located, said guidance means outputs guidance for the new optimal route and if the new optimal route is not located, said guidance output means outputs guidance for the previous optimal route.

15. A vehicular navigation system according to claim 11, wherein said road data is divided into a plurality of blocks in storage, and said area is set in the form of a number of said blocks.

16. A vehicular navigation system according to claim 11, wherein said area is within a given distance from the present position of the vehicle.

17. A vehicular navigation system according to claim 11, wherein said area is within a given angle from the present position in the advancing direction.

18. A vehicular navigation system according to claim 11, wherein said area is within a given distance from a point located ahead of the present position by a given distance and in a given direction.

19. A vehicular navigation system according to claim 11, wherein said route searching means adds a searching cost to the road data and changes the searching cost of the neighborhood road data in accordance with the selected traffic information.

20. A vehicular navigation system according to claim 11, wherein said route searching means searches for a new optimal route responsive to acquisition of traffic information corresponding to the neighborhood road data.

21. A vehicular navigation system according to claim 11 further comprising means for notifying a driver of the vehicle that traffic information corresponding to the neighborhood road data has been acquired.

* * * * *